United States Patent
Karlsson

(10) Patent No.: US 10,346,836 B2
(45) Date of Patent: Jul. 9, 2019

(54) PAYMENT SYSTEM AND METHOD INCLUDING ENABLING ELECTRONIC RECEIPTS

(71) Applicant: MYDO AB, Karlstad (SE)

(72) Inventor: Robert Karlsson, Karlstad (SE)

(73) Assignee: MYDO AB, Karlstad (SE)

( * ) Notice: Subject to any disclaimer, the term of this patent is extended or adjusted under 35 U.S.C. 154(b) by 442 days.

(21) Appl. No.: 15/038,154

(22) PCT Filed: Nov. 19, 2014

(86) PCT No.: PCT/SE2014/051378
§ 371 (c)(1),
(2) Date: May 20, 2016

(87) PCT Pub. No.: WO2015/076738
PCT Pub. Date: May 28, 2015

(65) Prior Publication Data
US 2016/0292677 A1     Oct. 6, 2016

(30) Foreign Application Priority Data

Nov. 22, 2013 (SE) .................................. 1351396-5

(51) Int. Cl.
*G06Q 20/20* (2012.01)
*G06Q 20/38* (2012.01)
(Continued)

(52) U.S. Cl.
CPC ......... *G06Q 20/3827* (2013.01); *G06Q 20/20* (2013.01); *G06Q 20/204* (2013.01);
(Continued)

(58) Field of Classification Search
None
See application file for complete search history.

(56) References Cited

U.S. PATENT DOCUMENTS

2010/0287057 A1   11/2010   Aihara
2012/0324242 A1*  12/2012   Kirsch ............... G06Q 20/0855
                                                              713/189
(Continued)

FOREIGN PATENT DOCUMENTS

WO    2011057412    11/2010
WO    2013075071     5/2013

OTHER PUBLICATIONS

International Search Report issued in PCT/SE2014/051378, dated Mar. 20, 2015, pp. 1-3.
(Continued)

*Primary Examiner* — Paul Danneman
(74) *Attorney, Agent, or Firm* — Jeffrey S. Meicher; Meicher Patent Law PLLC

(57) ABSTRACT

The invention relates to a system comprising: a server (1) in communication with a plurality of point-of-sale (POS) terminals (2), point-of-sale (POS) terminals (2) arranged to communicate wireless with a consumer device (3); and a logic (4) stored on the costumer device (3) arranged to; identify a point-of-sale (POS), enable check in of a virtual shopping cart (5) enabling shopping at said point-of-sale (POS) and enable check-out for payment at said point-of-sale (POS), logic (6) stored on the POS terminal (2) arranged enable communication with said costumer device (3), wherein said logics (4, 6) are arranged to enable said POS terminal (2) to complete the sale of merchandise (7) contained in said virtual shopping cart (5), and to produce a physical receipt and/or an electronic receipt (8), wherein said server (1) is also in communication with a plurality of point-of-sale (POS) terminals (2) and said virtual shopping cart (5) is handled by said server (1).

26 Claims, 21 Drawing Sheets

(51) Int. Cl.
*G06Q 20/32* (2012.01)
*G06Q 20/40* (2012.01)
*G06Q 30/06* (2012.01)

(52) U.S. Cl.
CPC .......... *G06Q 20/209* (2013.01); *G06Q 20/32* (2013.01); *G06Q 20/3276* (2013.01); *G06Q 20/4014* (2013.01); *G06Q 30/0633* (2013.01)

(56) References Cited

U.S. PATENT DOCUMENTS

| | | | |
|---|---|---|---|
| 2013/0126610 A1* | 5/2013 | Aihara | G06O 30/06 235/383 |
| 2013/0138518 A1 | 5/2013 | Spencer | |
| 2013/0166332 A1 | 6/2013 | Ayman | |
| 2013/0198018 A1* | 8/2013 | Baig | G06Q 20/20 705/16 |

OTHER PUBLICATIONS

Written Opinion issued in PCT/SE2014/051378, dated Mar. 19, 2015, pp. 1-3.

* cited by examiner

Self service shopping

Menu based shopping

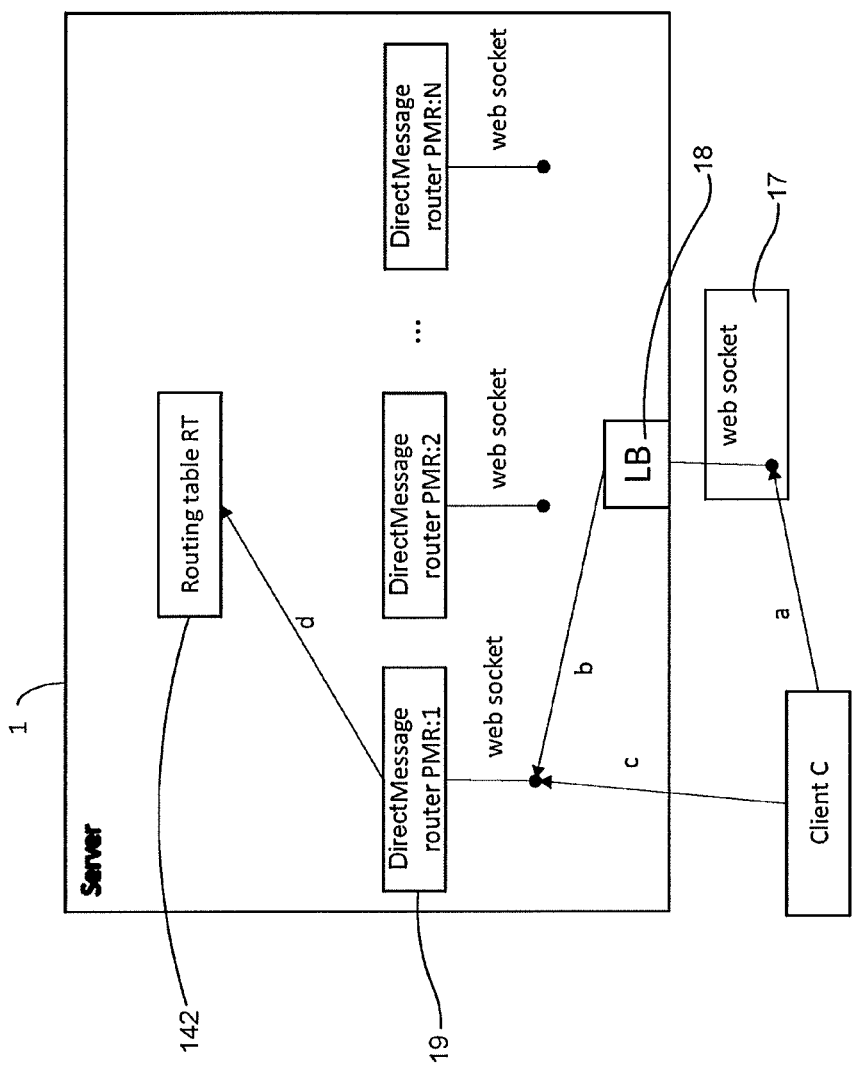

Direct online messaging

Direct offline messaging

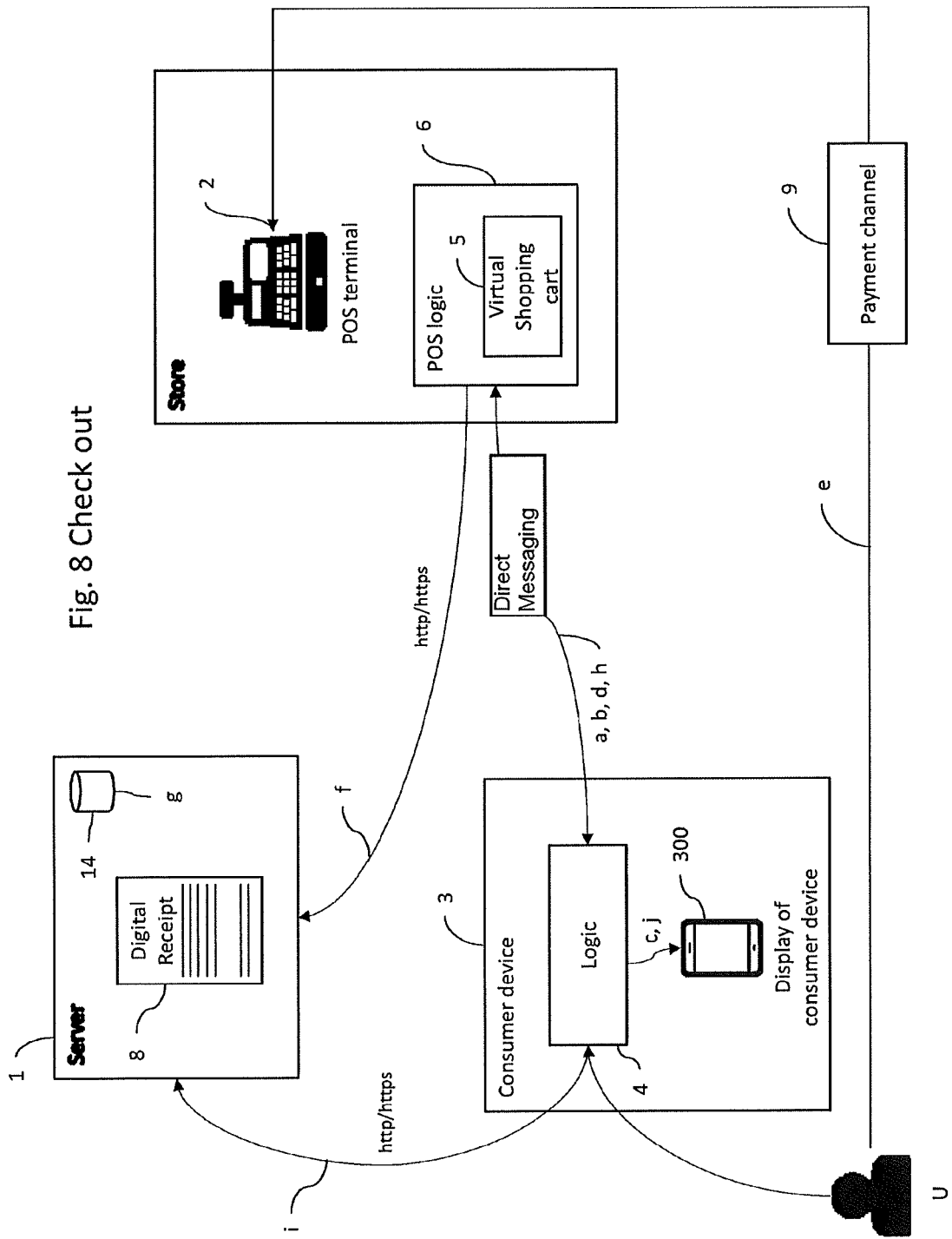

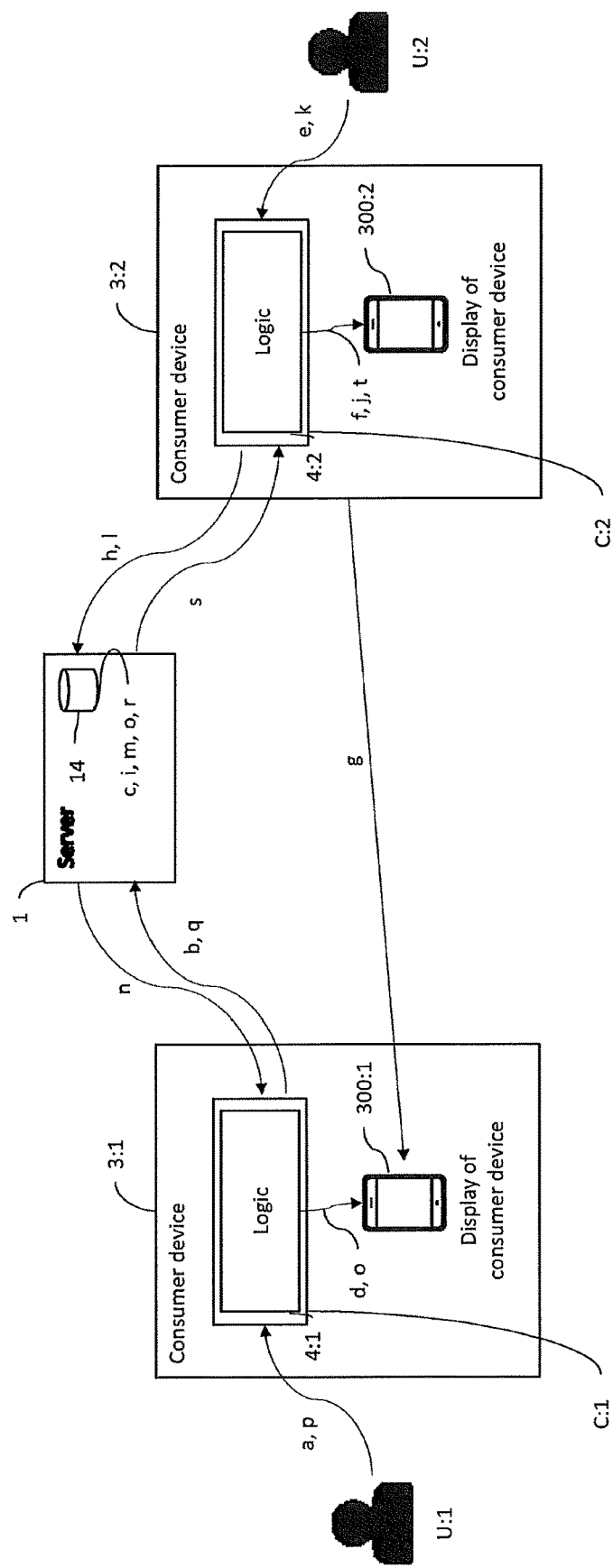

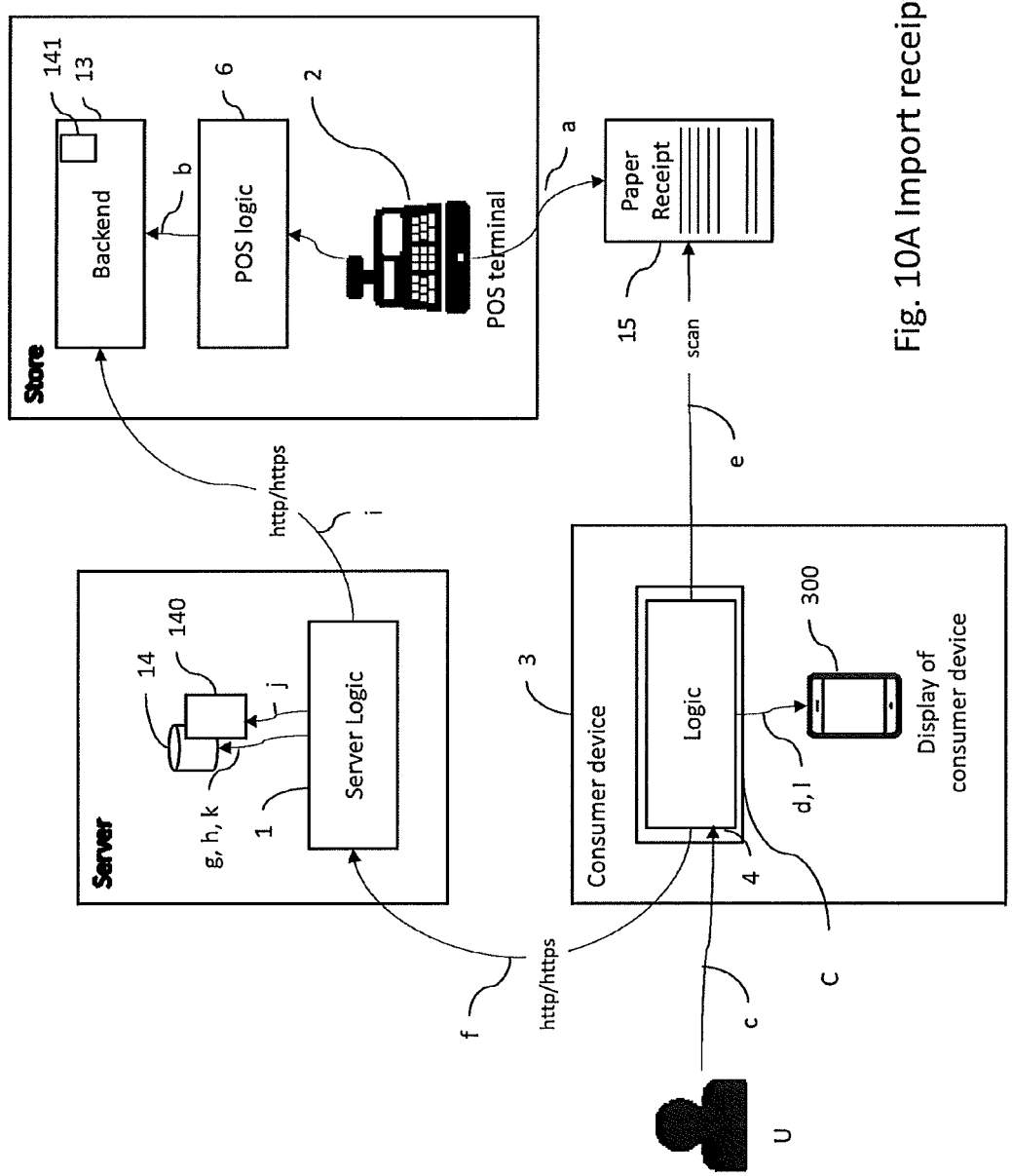
Fig. 10A Import receipt

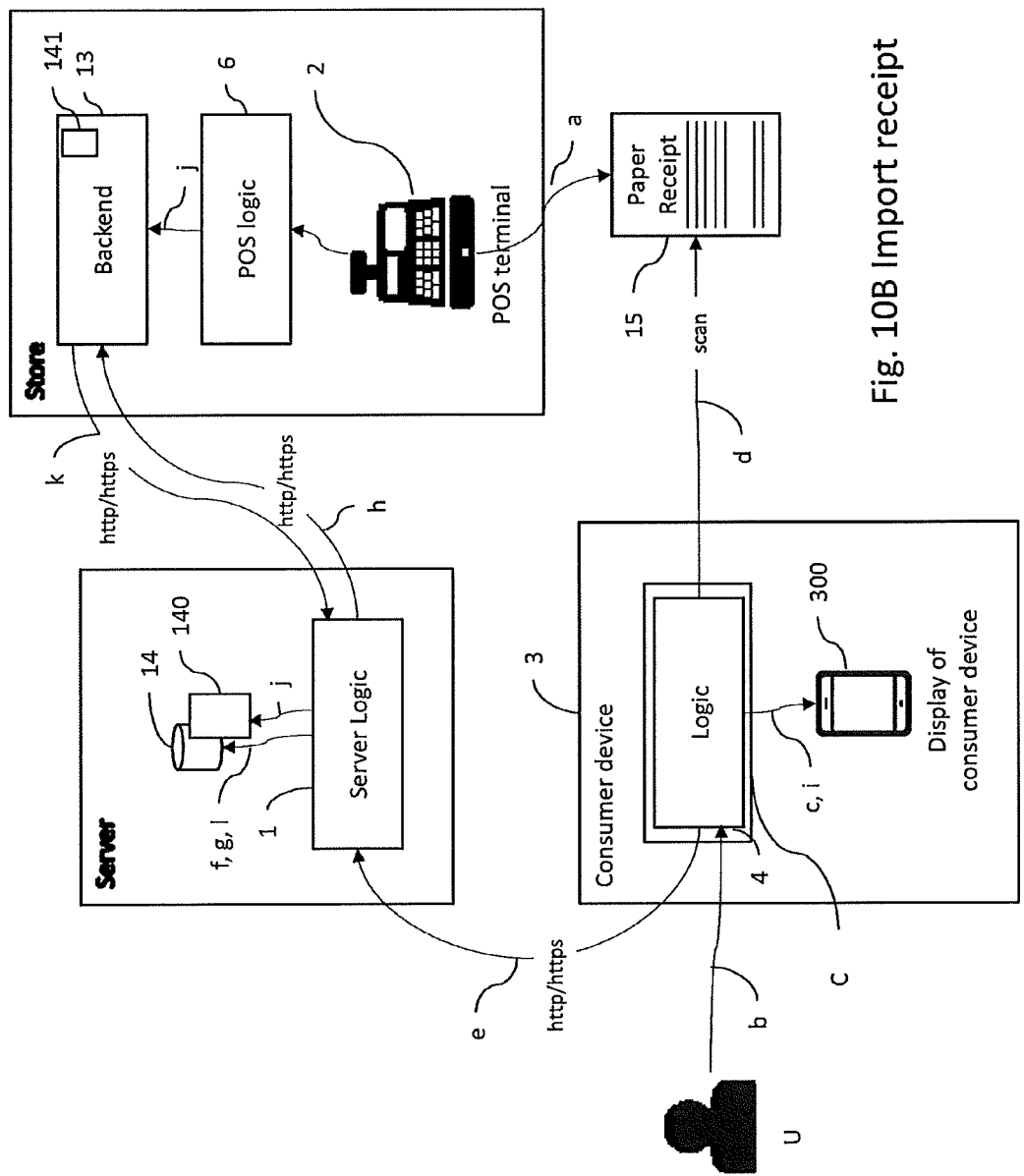
Fig. 10B Import receipt

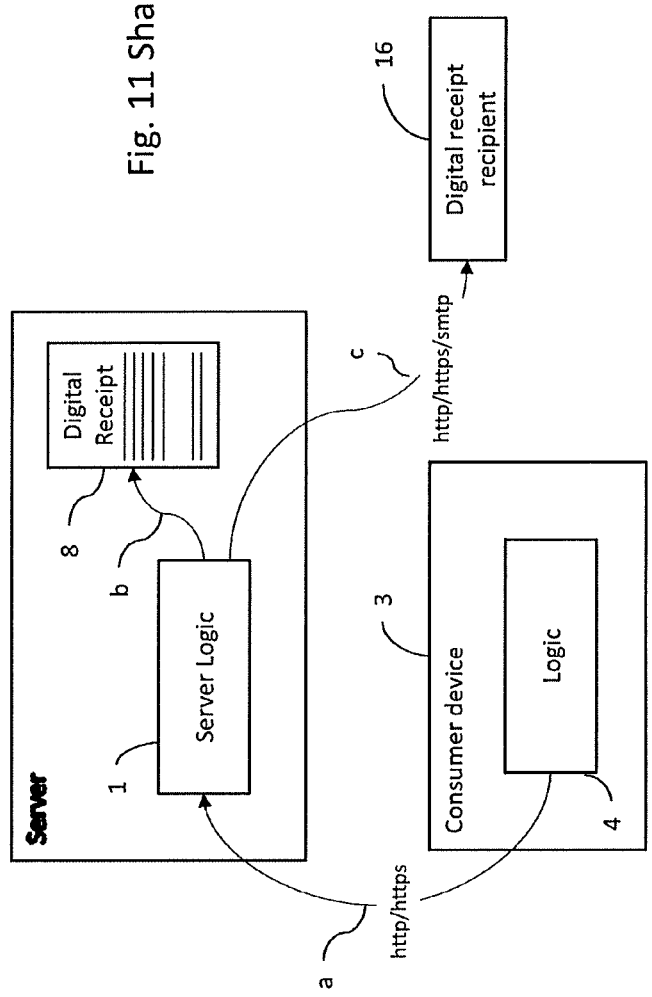
Fig. 11 Share receipt

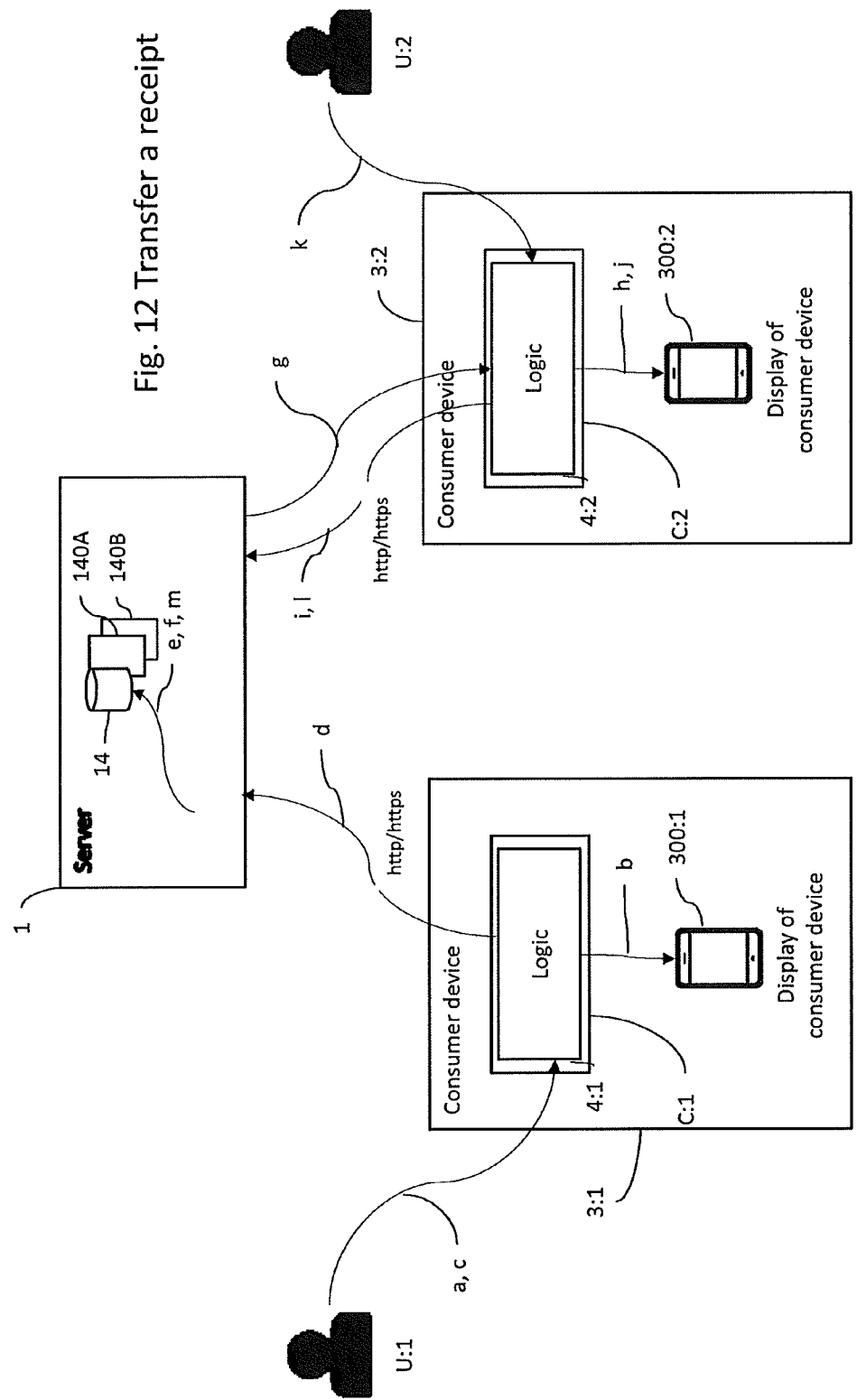

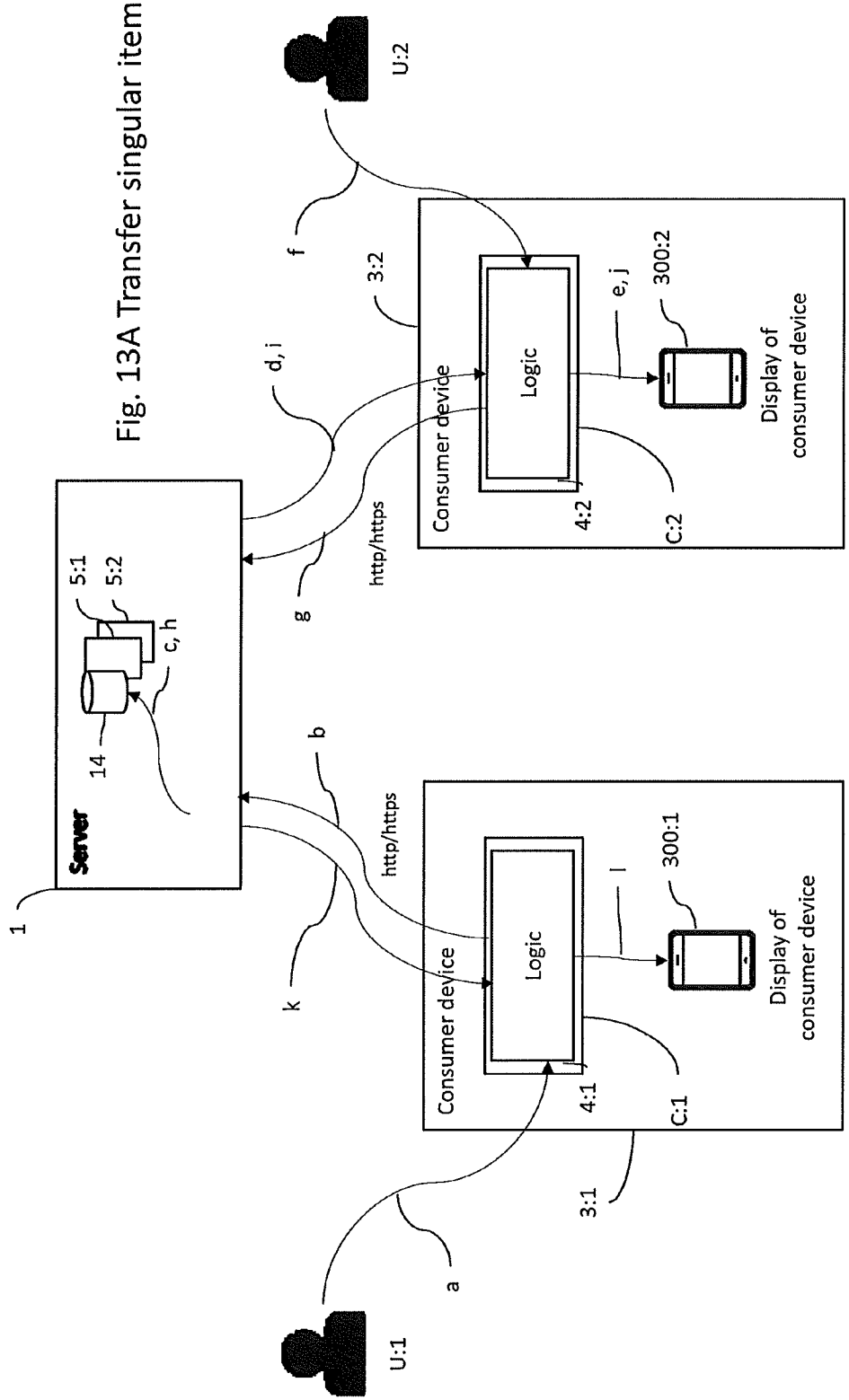

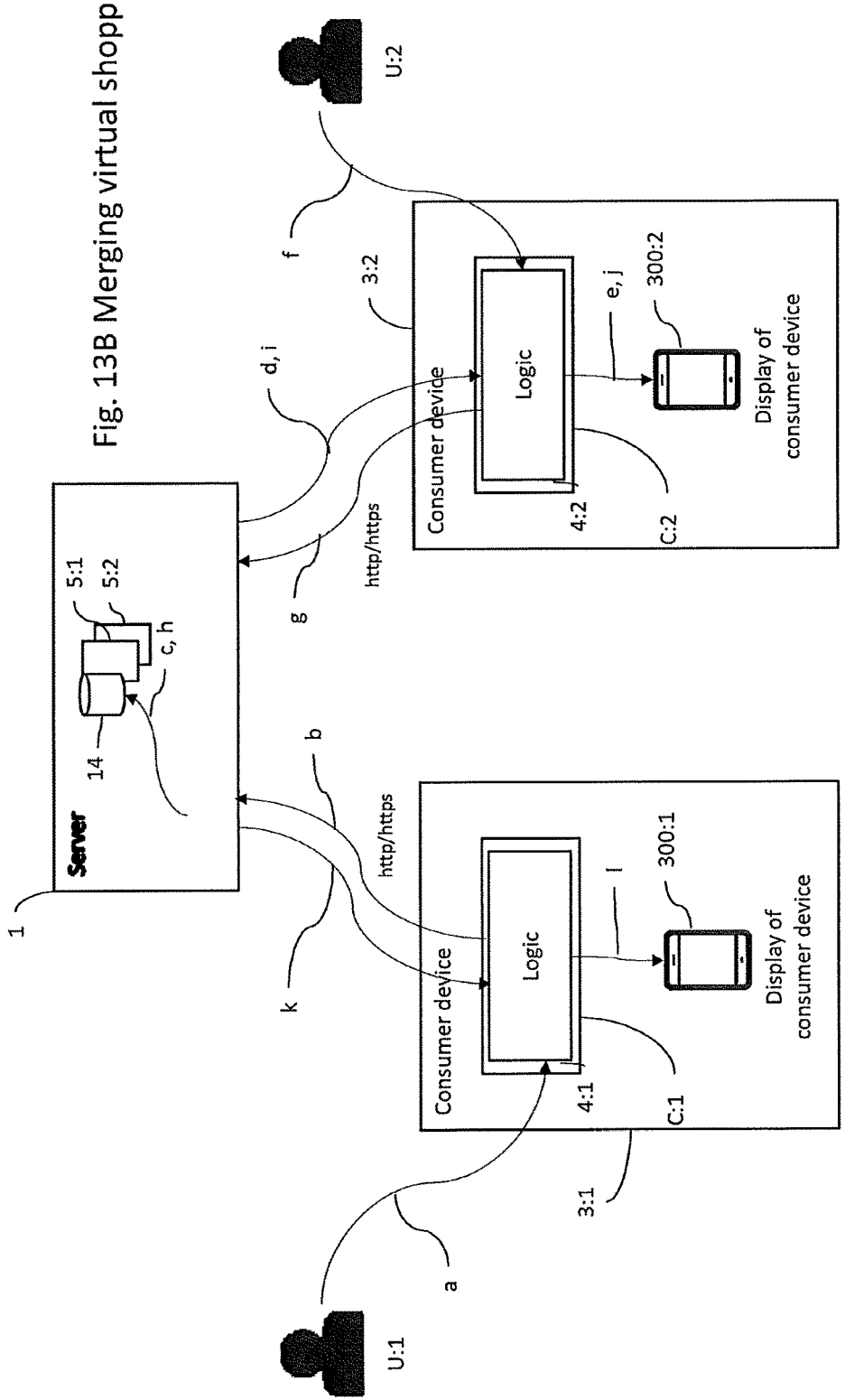

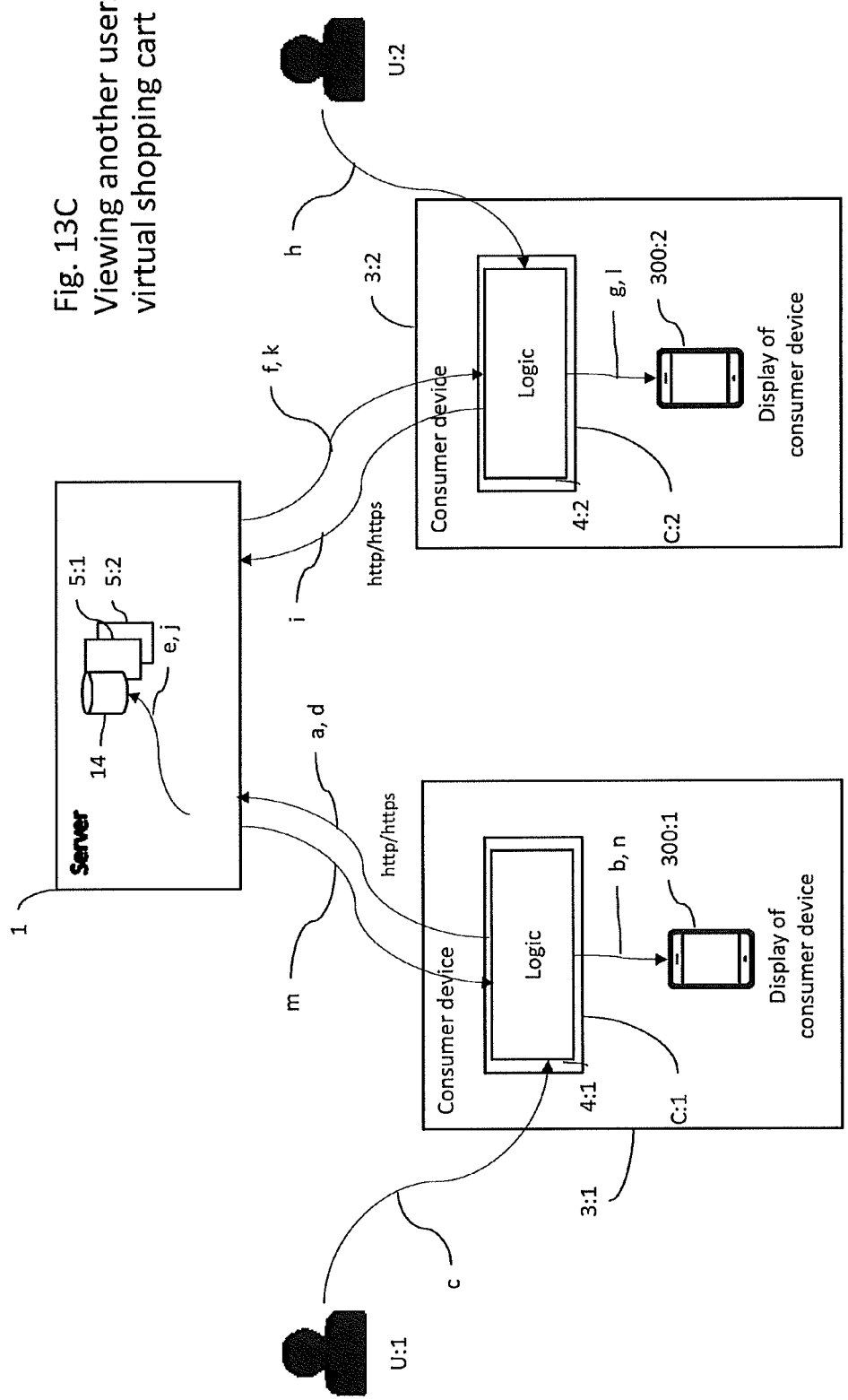

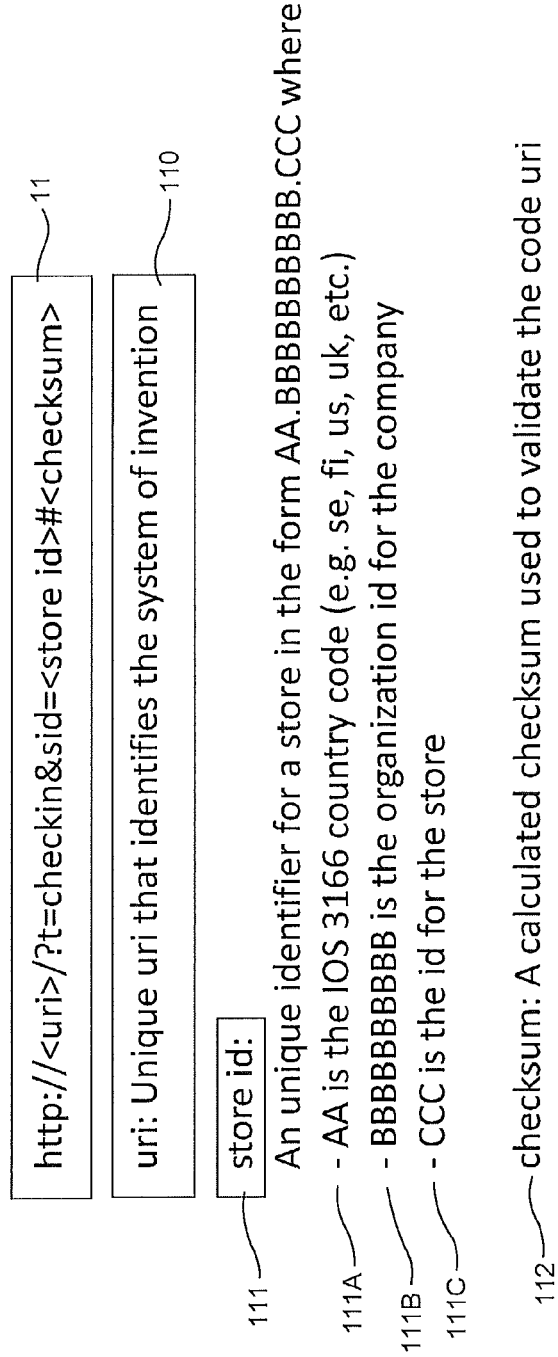
Fig. 14A Check-in-code uri

Fig. 14B Check-out-code uri http://<uri>/?t=checkout&rid=<register id>#<checksum> uri: Unique uri that identifies the system of invention register id:
An unique identifier for a POS terminal in the form AA.BBBBBBBB.CCC.DDD where
- AA is the IOS 3166 country code (e.g. se, fi, us, uk, etc.)
- BBBBBBBB is the organization id for the company
- CCC is the id for the store
- DDD is the id for the POS terminal checksum: A calculated checksum used to validate the code uri

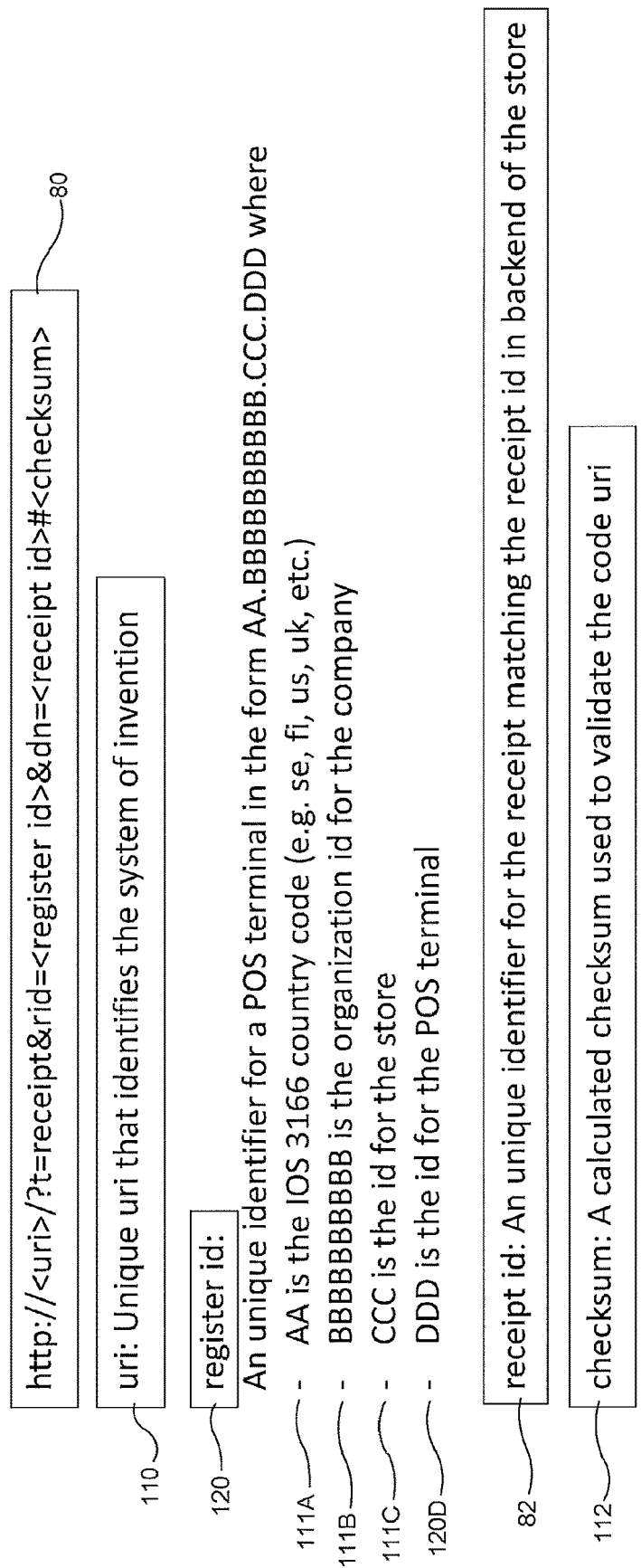

Fig. 14D Account association uri http://<uri>/?t=associate&zid=<association id>#<checksum>   22 uri: Unique uri that identifies the system of invention — 110 association id: An unique identifier that for a association between two accounts — 220 receipt id: An unique identifier for the receipt matching the receipt id in backend of the store — 82 checksum: A calculated checksum used to validate the code uri — 112

PAYMENT SYSTEM AND METHOD INCLUDING ENABLING ELECTRONIC RECEIPTS

FIELD OF THE INVENTION

This invention relates to a method and system comprising a server in communication with a plurality of point-of-sale terminals, wherein said point-of-sale terminals are arranged to communicate wirelessly with a plurality of consumer devices; and a logic stored on the consumer device is arranged to; identify a store, enable check-in in said store thus creating a virtual shopping cart enabling shopping at said store and enable check-out for payment at said POS terminal in said store, and logic stored on the POS terminal arranged to enable communication with said costumer device.

BACKGROUND INFORMATION

From WO 2011057412 A1 is known series of processes and methods designed to seamlessly capture detailed transactional data from merchant's point-of-sale environments and generate final presentments of electronic receipts for both consumers and merchants, accessible from their destination accounts, all in real time. Objectives are to: migrate all printed paper receipts to electronic forms; enable consumer facing post-sales management capabilities; increase self-serve; create new shopping and post-shopping experiences and satisfaction rates; significantly reduce administrative and storage requirements and costs, and provide more time for work productivity. Consumers and merchants are able to create various reports and are able to directly submit them from their destination accounts for: expenditure accounting and tax purposes, payment processing, and for other company expenses. However the system is built on the use of a credit card, or similar electronic mean leading to some disadvantages e.g. inability to pay with cash.

From US 2013138518 A1 is known devices, systems, and methods disclosed for facilitating a wireless transaction by coupling or associating an identifier to a location. The identifier is read, retrieved, or received by a consumer's wireless communication device to connect to a POS terminal. Once connected, the wireless communication device sends a location identifier to the POS terminal, so that the POS terminal can associate the wireless communication device with the location. Once an association is established, the POS terminal then presents options. The POS terminal receives selections, and alerts a staff member of selections and the location. In many instances, the POS terminal may also add the selection to a bill or an invoice. However also the system has some disadvantages, e.g. similar to WO 2011057412.

From US 2013166332 A1 is known devices, systems, and methods disclosed for facilitating a wireless transaction providing electronic receipts. However, also this system has some disadvantages, e.g. similar to WO 2011057412.

SUMMARY OF THE INVENTION

It is an object of the present invention to overcome or at least minimize disadvantages of prior and solutions, which is achieved by means of a system and method as defined is the claims, whereby increased flexibility is achieved for users to interact electronically with different/various store locations/systems, e.g. not requiring the registration of a credit card as a necessity and for resellers by enabling use of existing POS terminal and store systems. Instead the system design is based on the use of a virtual shopping cart, that mainly is controlled/handled by the user and that at the time of check out is still maintained by the user but gets into control of a POS terminal, e.g. handled by a cashier.

A further advantage of the system and method according to the invention is that the existing hardware, i.e. existing infrastructure system of different point-of-sales may be used without any substantial changes, making it very cost efficient from a holistic perspective and indeed flexible. Moreover this means that staff/cashiers at various POS terminals may easily interact in integrating the invention to existing systems and structures. Furthermore the invention may enable easy conversion to self-service checking out and/or less time consuming interaction by means of the system design, e.g. enabling more availability of staff for consumers at various locations in a store.

According to further aspects to the invention said logics are arranged to enable real time view within the display of the costumer device displaying the information processed by said POS terminal, which provides the advantage that the consumer may interact in real time during the check-out session.

According to further aspects of the invention said point-of-sale terminal is arranged to enable payment by means of a payment channel that is independent of said costumer device, which provides the advantage that a consumer may freely choose to pay by any desired means accepted by that point of sale.

According to further aspects of the invention said logic stored on the costumer device is arranged to enable authorization by means of third party identity provider, which provides the advantage that extra security may be provided in connection with authorization also a very efficient manner of extracting desired data.

According to further aspect of the invention, which provides the advantage that a very reliable and easy handled activation of shopping session may be initiated.

According to further aspect to the invention said logic stored on the costumer device is arranged to electronically identify a check-out code and to use said check-out code to connect to a point-of-sale terminal for completion of a sale, which provides the advantage that reliable and easy handled checking out/payment may be achieved.

Further aspects and advantages of the invention will become apparent from the following description.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 6 shows a preferred embodiment of the workflow of client registration, FIG. 8 shows a preferred embodiment of the workflow of check-out FIG. 9 shows a preferred embodiment of the workflow of account association, FIG. 10A shows a preferred embodiment of the workflow of importing receipt, FIG. 10B shows a preferred embodiment of the workflow of importing receipt where the receipt is not ready, FIG. 11 shows a preferred embodiment of the workflow of sharing a receipt, FIG. 12 shows a preferred embodiment of the workflow transferring a receipt between users, FIG. 13A shows a preferred embodiment of the workflow of transferring singular items between virtual shopping carts, FIG. 13B shows a preferred embodiment of the workflow of merging virtual shopping carts, FIG. 13C shows a preferred embodiment of the workflow of viewing other users virtual shopping charts, FIG. 14A shows a preferred embodiment of the check-in code uri, FIG. 14B shows a preferred embodiment of the check-out code uri, FIG. 14C shows a preferred embodiment of the import receipt uri, FIG. 14D shows a preferred embodiment of the account association uri In the following detailed description some expression are used that are explained in more detail below;

Figure 1:
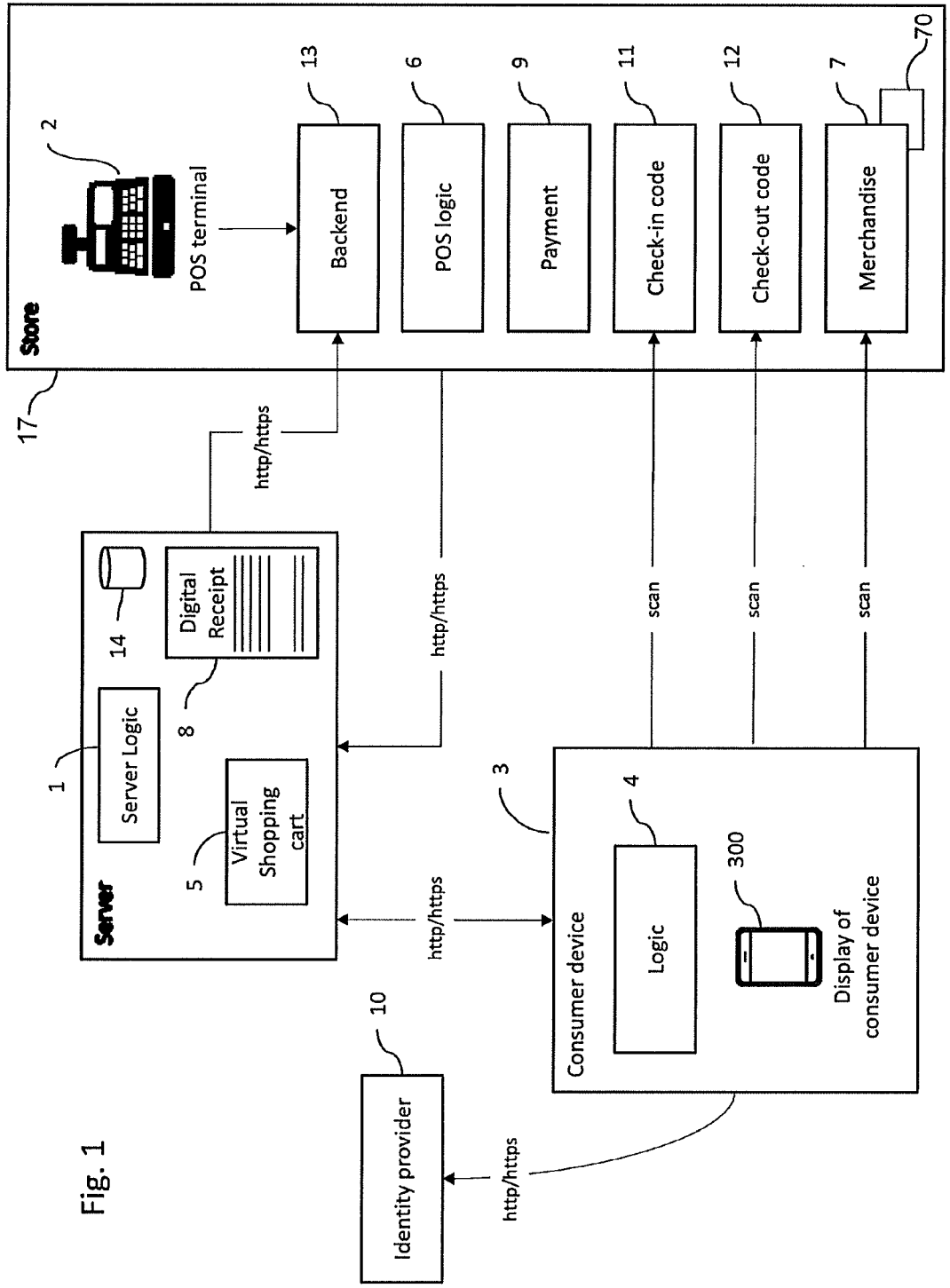
FIG. 1 shows an overview of a preferred embodiment of the system and workflow according to the invention.

User U—e.g. a user of a consumer device 3 having a client C installed and/or optionally an employee at a company.

Consumer device—a mobile device, e.g. a smart phone, where the client C is installed.

Client C—a client app for Android or iPhone or Windows Phone or any other operating systems. Further, it is evident for the skilled person that client C may refer to a variety of software solutions that may communicate with server 1 such as POS logic 6, backend 13, etc.

Code reader app—an optional application for reading QR-codes, barcodes, NFC, RFID or similar contactless technology, which may be used for an alternative way to get the client C installed.

Logic—it is evident for the skilled person that the expression logic must be a construed in a broad sense, i.e. hardware and/or software solutions defined by a set of axioms and rules which are executed by a processor.

Server—a web application, e.g. in a cloud service such as Windows Azure, that provides functionality such as API methods or direct message routing for any client C.

Store—a physical or virtual location providing merchandise 7 for sale such as retail store, restaurant, kiosk, web shop, catalog, market stand, etc. A store normally relates to a business entity including a plurality of POS terminals and sales staff for check-out and completion of transactions, but the expression must in regard to the invention be construed in a wider sense, e.g. including a store with merely one point of sale terminal and indeed that may be unmanned, i.e. without staff, e.g. an automated car wash.

POS terminal—the physical or virtual location where the check-out and completion of transaction is made. A physical POS terminal may or may not be manned by a cashier S. A virtual POS terminal is fully automated and facilitates check-out without the involvement of any cashier S. Scenarios where applicable include parking lots, vending machines, kiosks, etc.

Receipt archive—a storage for archived digital receipts. Preferably all digital receipts are stored here and are accessible for the user through the client.

Backend—a backend system containing information for a POS terminal, e.g. item (merchandise) register, rebates, price information, etc.

Check-out code—a QR-code, barcode, NFC, RFID or similar contactless digital information that may be scanned by the client C to check-out from the store. Preferably it may be located at the POS terminal.

Check-in code—a QR-code, barcode, NFC, RFID or similar contactless digital information that may be scanned by the client to check-in at a store, which preferably may be located at the store entrance.

Cashier S—an employee at the POS that may operate a POS terminal.

Company—a company where the User may be an employee.

ERP system—a company related ERP system (Enterprise Resource Planning) integrated with the system of the invention for receiving digital receipt information.

Additional codes, e.g.;
 A receipt from a previous purchase—having a QR-code, barcode, NFC, RFID or similar contactless digital information on a paper receipt from a POS terminal of a previous purchase.
 Advertisements—a QR-code, barcode, NFC, RFID or similar contactless digital information on a poster, flyer, web site banner, advertising screen or other advertising media.

Identity provider—an online service for user identification.

Mail recipient—a person receiving a mail sent from the system.

File hosting service—an online storage for storing digital documents and other files.

Application store—an application or web site enabling installations of applications (apps) on a mobile device, e.g.;
 Google play
 Apple AppStore
 Windows Store
 Or other online digital media store.

Payment service—an online payment service for making payments by means of a mobile device.

Virtual shopping cart—it is evident for the skilled person that the expression virtual shopping cart refers to an electronic entity that may contain information about items, services, time limited right of possession of a physical or virtual location (such as a parking lot, hotel room, theatre seat, data storage, etc.) that are offered by a store (17). Furthermore any rebates, warranty information, amount due, etc. Virtual shopping cart is stored digitally in server 1 and is accessible from any authorized client C such as consumer device 3, POS terminal 2, etc.

Session—an ongoing activity associated with a virtual shopping cart 5 and a user U. May be one of one of the following types: self-service shopping, menu based shopping or digital receipt. At time of check-out the session may be handled by a POS terminal 2 where it is represented as part of a transaction.

Transaction—the retail transaction performed by a POS terminal 2. When the transaction is done the related session is finalized.

Message—A message is a set of data comprised of machine-readable information, such as XML, JSON, byte data, Base64 encoded data, etc. A message may also contain information that identifies the sending and receiving client C.

Direct messaging—A method of sending messages between clients C. A message may be sent from one client C to another by posting the message at the direct message router. Direct message router may deliver the message to the receiving client C directly through an open connection or queued for later delivery if the receiving client C is disconnected. A message may also be sent between two clients C by using direct connection, i.e. by bypassing the message router, if the clients C are capable of connecting directly to each other (i.e. connected to the same network or by using any communication method such as Bluetooth, NFC, WiFi or any other commonly used methods for direct communication).

Direct message node—A part of a cluster (e.g. load balancing cluster) comprising one or more direct message nodes, forming the direct message router functionality in server 1.

Direct message router—A web application in server 1 that provides functionality such as API methods for direct message routing for any client C.

DETAILED DESCRIPTION OF THE PREFERRED EMBODIMENTS

The following detailed description, and the examples contained therein, are provided for the purpose of describing and illustrating certain embodiments of the invention only and are not intended to limit the scope of the invention in any way.

FIG. 1 shows an overview of a preferred workflow and the technical deployment of the invention. The system comprises a server 1 which server 1 is in communication with a plurality of POS terminals 2. Said POS terminals 2 are arranged to communicate wireless with a consumer device 3, such as a smart phone. A logic 4 is stored on the costumer device 3 arranged to identify a store, enable check in of a virtual shopping cart 5 enabling shopping at said store and to enable check-out for payment at said store. There is also a POS logic 6 stored on the POS terminal 2 arranged to enable communication with the consumer device 3. The logic 4 in the consumer device 3 and the POS logic 6 are arranged to enable said POS terminal 2 to complete a sale of merchandise 7 contained in said shopping cart 5 and to produce an electronic receipt 8, wherein information regarding each merchandise 7 may easily be retrieved via a unique merchandise code 70.

Each merchandise 7 is preferably identified by means of unique identifier 70. That unique identifier 70 may typically be in the form of a digital identifier code, which is visually present on each merchandise 70, e.g. EAN code in the form of scan able bar code. Typically that unique identifier 70 will be stored digitally in the backend 13 system of a store, together with information regarding that merchandise 7, e.g. producer, price, etc. It is also foreseen unique identifiers 70 may be stored in the data storage 14 directly connected to the server 1 of the invention. Irrespective of where the unique identifier 70 is stored, it will be provide beneficial possibilities for producers and consumers to get in direct contact with each other via the client C. For instant the unique identifier 70 may by means of the client C enable easy access to the webpage of a producer to get real time information regarding a selected merchandise 7. Moreover the invention may provide the possibility for a producer to get in contact with selected consumers U by means of the system keeping record of purchases of specific merchandise 7, providing retrievably records in the data storage 14 connecting a unique merchandise code 70 with specific users U. As apparent from other parts of the description the unique identifier 70 must not be in a form of a standardized code, e.g. EAN, but may also be uniquely created by means of the server 1 of the system.

If a user U has not used the system according to the invention before he/she needs to install an app, i.e. a client C including the logic 4 on his/her consumer device 3. The user need to download and install the app preferably via Google Play (Android based devices) or Apple App Store (IOS based devices) or Windows Store (Windows Phone based devices). Besides installing the app directly from Google Play or Apple App Store or Windows Store (by searching for it) the novel system provides an alternate way to install the application which will be described below.

A user U starts a code reader app on the consumer device 3 and scans a specific code: provided (e.g. in the form of physical stickers/paper sheets and/or a screen display) by the system providers, e.g. in the form of a Check-out code 12, Check-in code 11, or any other additional code.

The code reader app identifies the scanned code as an URL and asks the user to open the scanned URL with the web browser on the consumer device 3. The URL points to a web application in an API of the system that redirects the request based on the operating system used in the consumer device 2, e.g. redirects the request to either Google Play or Apple App Store or Windows Store.

The user U then follows the instructions to install the user client C (the app with the logic 4) on the consumer device 3.

Figure 2:
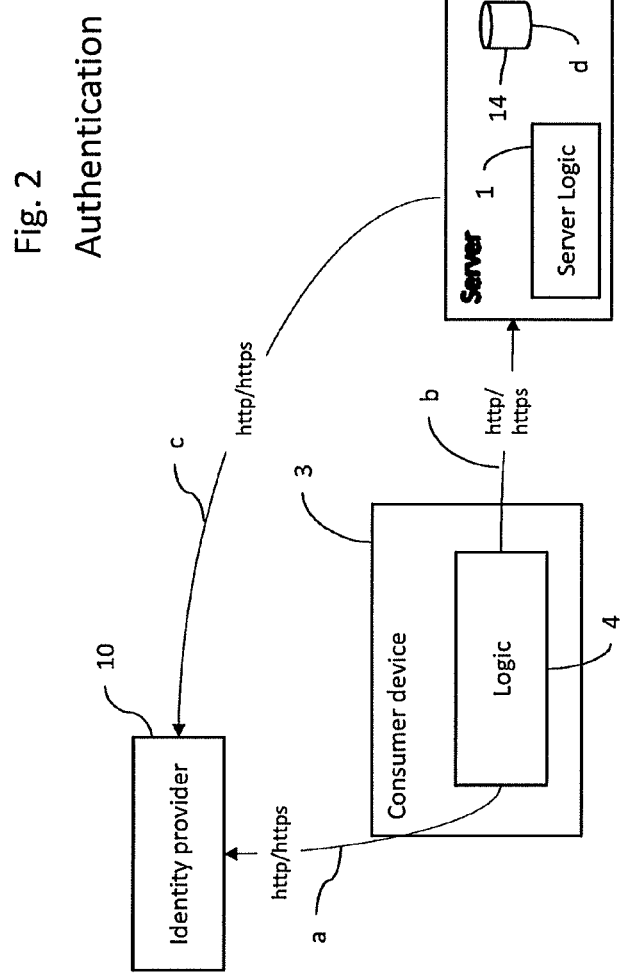
FIG. 2 shows a preferred embodiment of the workflow for the authentication.
Figure 3:
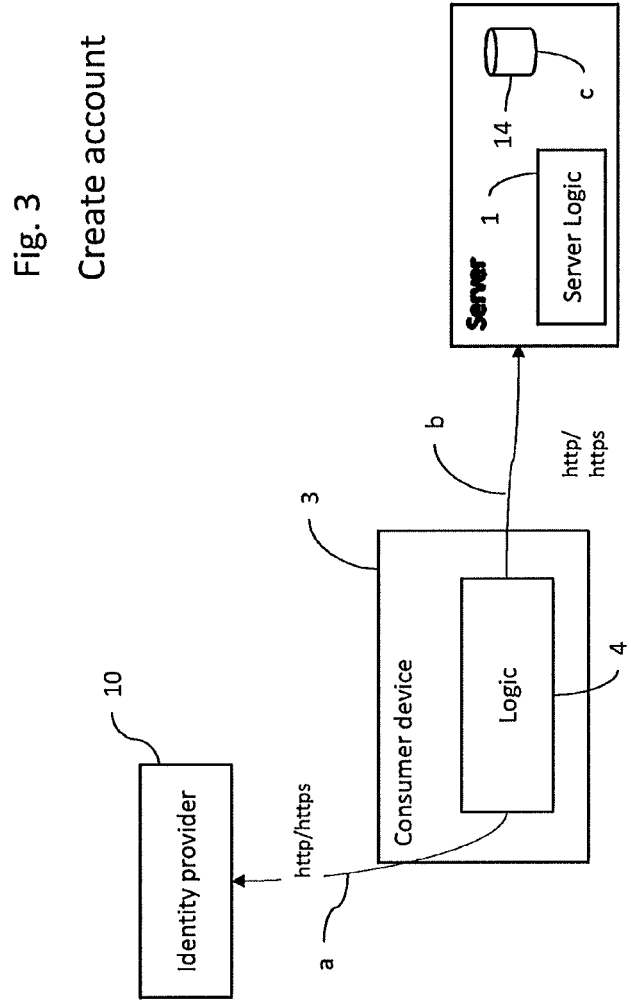
FIG. 3 shows a preferred embodiment of the workflow of creating an account.

When the client C is installed on the consumer device 3 and is started the first time, the user U will need to confirm his/her identity through an identity provider 10, such as Facebook, Google, Microsoft Account, Twitter, etc. If the user U does not have an account in any of the provided identity providers 10, he/she will be able to create one at this time. The workflow is shown in FIG. 2.

a The user U selects one of the provided identity providers 10 to authenticate with. The identity provider 10 asks the user to accept the client C to access information from his/her/its user account. The identity provider may at this point ask the user U for his/her/its user credentials and in case when the user U does not have an existing account, to create an account at the identity provider 10. The identity provider 10 may require secure authentication by other means than the user interface in client C. E.g. using a html/web browser form over https or app previously installed in customer device 3 for identity provider 10. After the authentication process between the identity provider 10 and the logic 4 is finished, the logic 4 in consumer device 3 receives an access token from the identity provider 10.

b Logic 4 in consumer device 3 calls the server 1 with the access token received from the identity provider 10 received in previous step.

c Server 1 verifies the access token 10 with the identity provider 10 by calling a web service method. The identity provider 10 returns either the identity of the user U or one an error (e.g. access token expired, user account does not exists, technical error, etc.). In the case the identity provider returns an error it may be returned to the logic 4 in consumer device 3.

d Server 1 looks up the identity received in previous step in the data storage 14. If the identity was not found the account may be created (see FIG. 3). If the identity already exists in data storage 14 result code OK and the account id is returned to the logic 4 of consumer device 3.

If the identity was not found in step d above the following steps may be performed. Also depicted in FIG. 3.
- a. Logic 4 in consumer device 3 authenticates with the identity provider 10 and retrieves the user identity of user U.
- b. Logic 4 in consumer device 3 calls the server 1 with user identity of user U received in step a.
- c. Server 1 creates an account record in data storage 14.

Direct Messaging

To enable direct messaging between clients such as mobile devices, POS terminals, etc. a client must be registered.

The workflow is described in FIG. 6:
- a. Client C connects to an external web socket endpoint 17 at server 1
- b. Load balancer (LB) 18, distributes the connection to one of the direct message router nodes 19 (PMR:1, PMR:2 . . . PMR:N (in this case PMR:1))
- c. Client C sends a handshake message to direct message router 19 (PMR:1) via the web socket connection 17, 18, 19 established in step b.
- d. Direct message router 19 (PMR:1) registers client C and itself in routing table (RT) 142.

If two clients C are registered, e.g. as described above they can send direct messages to each other.

Figure 7A:
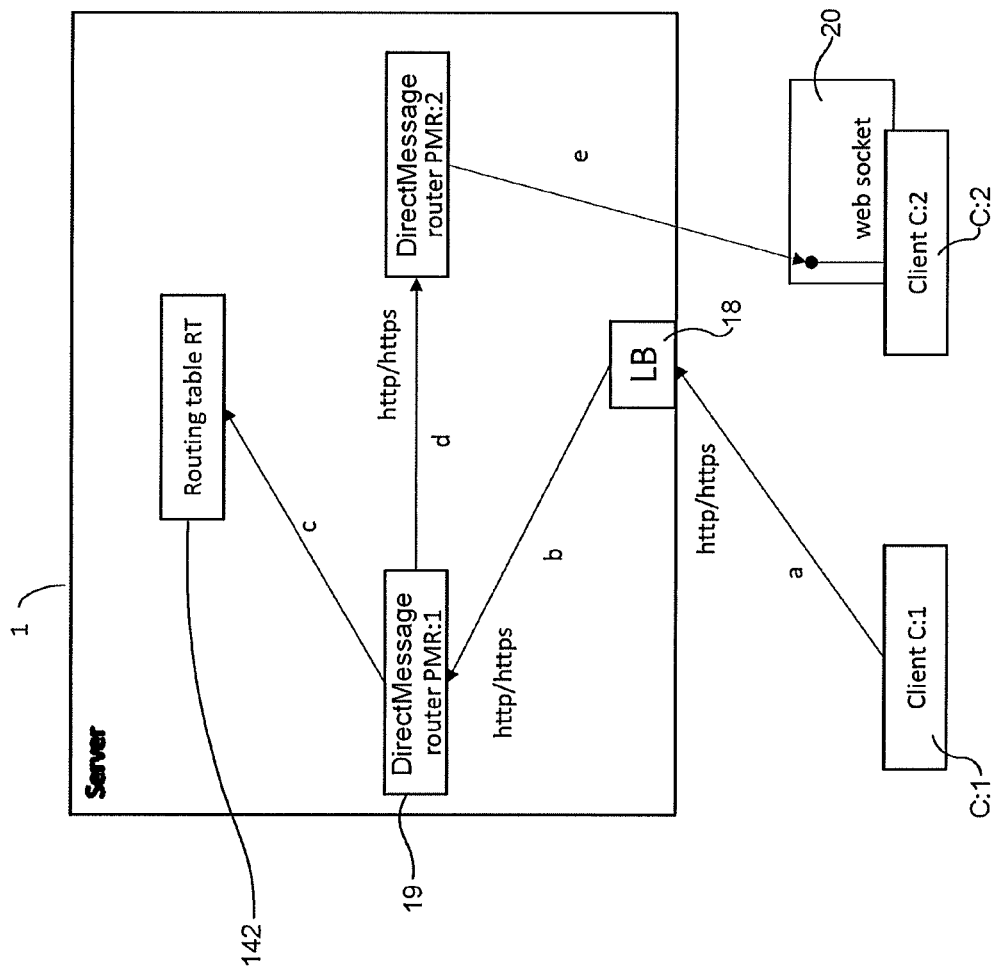
FIG. 7A shows a preferred embodiment of the workflow of online messaging.

Sending a direct message from client C:1 to client C:2 where both clients are online is described in FIG. 7A:
- a. Client C:1 calls server 1 with the message.
- b. Load balancer 18 distributes the message to one of the direct message router nodes 19 (in this case PMR:1).
- c. Direct message router 19 (PMR:1) queries router table 142 for the direct-message node 19 for client C:2 (in this case PMR:2).
- d. Direct message router PMR:1 calls the direct message router PMR:2 with the message.
- e. Direct message router PMR:2 sends the message to the web socket 20 of client C:2.

The connection between client C:1 and client C:2 may be optimized by direct connection, i.e. by bypassing the message routing functionality of the server 1, if client C:1 and client C:2 are capable of connecting directly to each other (i.e. connected to the same network or by using any communication method such as Bluetooth, NFC, WiFi or any other commonly used methods for direct communication). In this case messages will be sent directly using techniques like http/https, raw TCP, SSL, etc. Server 1 may assist in determining which method for direct communication to use.

If the recipient client C is not registered at the time when a message is sent a message may be marked for later delivery. When marked for later delivery, the message may or may not have a time of expiration. The message may then be queued and delivered as soon as the client C is registered in direct messaging.

Figure 7B:
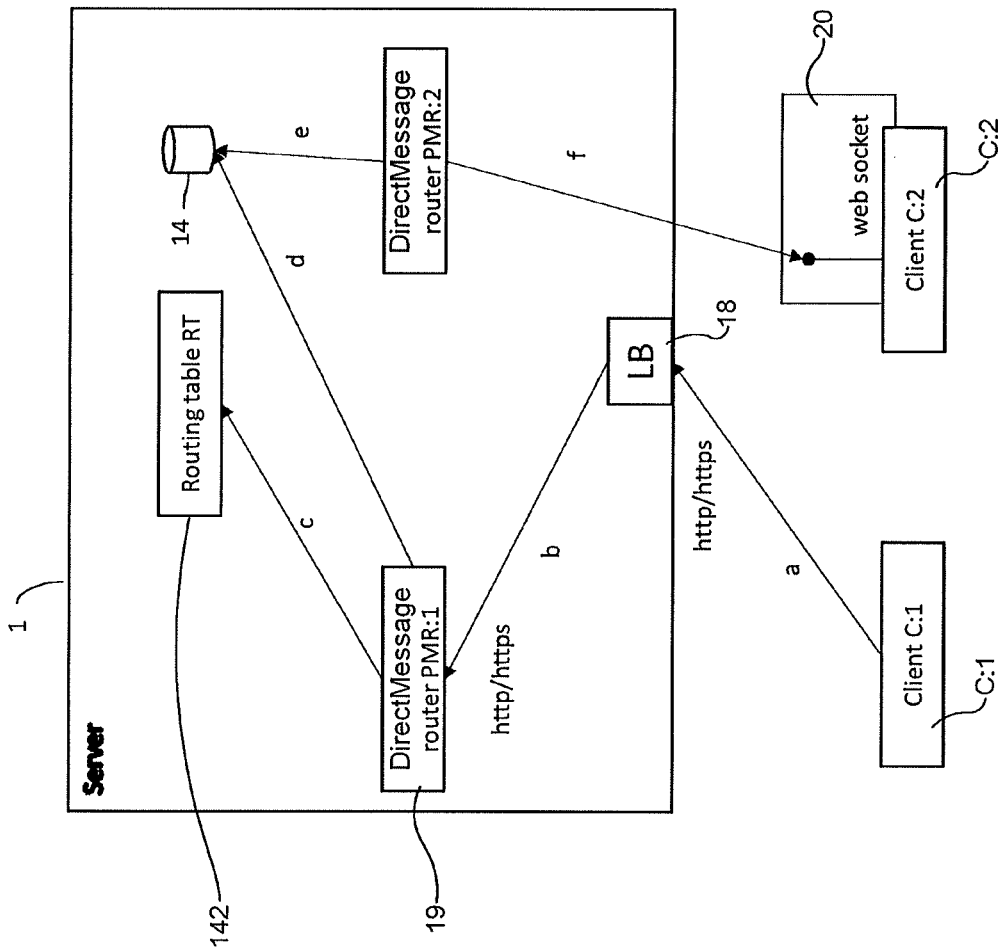
FIG. 7B shows a preferred embodiment of the workflow of offline messaging.

Sending a direct message from client C:1 to client C:2 where client C:2 is not registered is described in FIG. 7B:
- a. Client C:1 calls server 1 with the message.
- b. Load balancer 18 distributes the message to one of the direct message router nodes (in this case PMR:1).
- c. Direct message router 19, PMR:1 queries router table 142 for the direct-message node for client C:2 (in this case there is no registration for client C:2).
- d. Direct message router PMR:1 writes the message to data storage 14.
- e. When client C:2 at a later time is registered (in this case in PMR:2), direct message router 19 queries data storage 14 and retrieves offline messages for client C:2.
- f. Direct message router PMR:2 sends the message to the web socket 20 of client C:2.

With the self-service shopping functionality user U of consumer device 3 to check in at a store (17) by scanning check-in code 11, e.g. placed at a store (17) entrance. Logic 4 on consumer device 3 is arranged to electronically identify check-in code 11 and to use said check-in code 11 to check-in at the selected store (17).

This will start a self-service shopping session where user U, may scan QR-codes, barcodes, NFC, RFID or similar contactless codes attached on merchandise 7 in the store (17).

By scanning check-out codes 12, placed at one of the cash desks in the store (17), user ends the shopping session and starts a check-out session. During the check-out session client C and the logic 6 of the cash register communicate directly with each other, e.g. via a direct messaging. At this time display 300 of device 3 may be used as an external display to POS terminal 2 and display information from POS terminal 2 in real time. Cashier S may modify the list of merchandise 7 by adding, changing or removing items, whereby all changes may directly be reflected in display 300. The check-out session ends when user U has paid in full to cashier S and cashier S finalizes the transaction in POS terminal 2. When the check-out session has ended a digital receipt 8 is generated and may be displayed in display 300 of client C.

Figure 4:
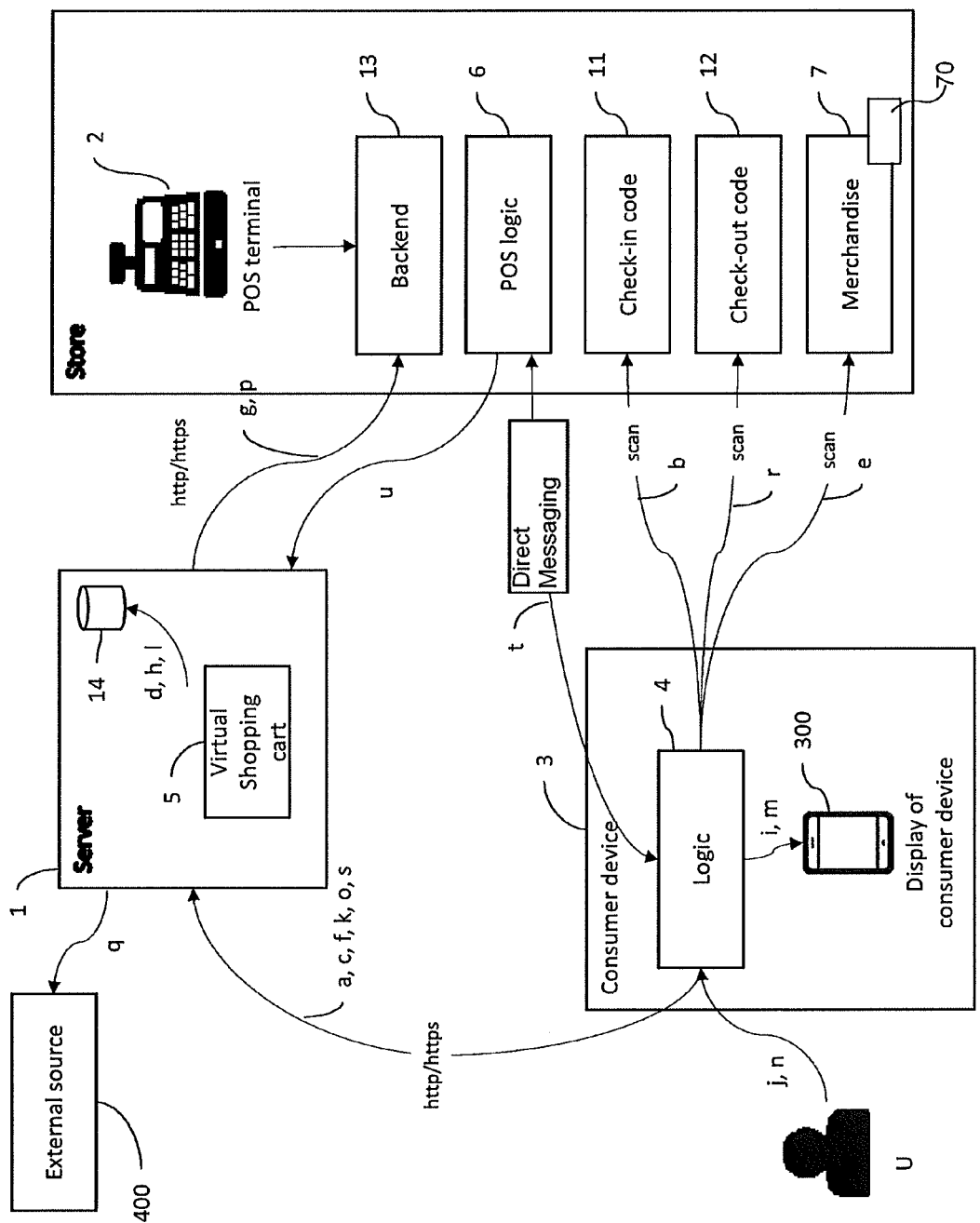
FIG. 4 shows a preferred embodiment of the workflow of self-service shopping.

FIG. 4 shows an example of a workflow of self-service shopping according to the invention.
- a. Logic 4 in consumer device 3 calls server 1 and retrieves a list of nearby stores (17), based on the current location from a GPS function in consumer device 3, from which user U may select a specific store (17).
- b. Logic 4 in consumer device 3 may also select a store (17) by scanning a specific check-in code 11 containing an identifier for the selected store (17).
- c. Logic 4 starts a new self-service shopping session by calling server 1 with the identifier for the selected store (17).
- d. Server 1 creates a new session and a virtual shopping cart 5 in data storage 14.
- e. User U may scan codes on merchandise 7 by means of logic 4.
- f. Scanned codes from merchandise 7 are forwarded to server 1
- g. Server 1 calls backend 13 and retrieves information about the merchandise 7.
- h. Server 1 updates the shopping cart 5 in data storage 14 whereby virtual shopping cart 5 is returned to logic 4.
- i. Logic 4 may update display of consumer device accordingly.
- j. The user U may modify an item in the virtual shopping cart 5 by means of logic 4. Examples of modifications on a line may include removal or changing the quantity of items in virtual shopping cart 5.
- k. Logic 4 calls server 1 to apply the modification on the corresponding item in virtual shopping cart 5.

l. Server 1 updates virtual shopping cart 5 in data storage 14. Virtual shopping cart 5 is then returned to logic 4.

m. Logic 4 may update display of consumer device accordingly.

n. User U may acquire more information about scanned merchandise 7 by means of logic 4.

o. Logic 4 sends a request to server 1 with the code 70 of scanned merchandise 7.

p. Server 1 calls backend 13 and retrieves information about the merchandise 7.

q. Server 1 may call external sources 400 for additional information about merchandise 7. Examples of external sources are manufacturers, price comparison web sites, etc. Gathered information is returned to logic 4.

r. When self-service shopping session ends, user U scans check-out code 12, e.g. located adjacent to one of the POS terminals 2 by means of logic 4.

s. Logic 4 calls server 1 and requests a check-out and retrieves the direct message address of POS terminal 2.

t. Logic 4 sends a check-out request to POS terminal 2 using direct connection.

u. POS terminal 2 calls server 1 and retrieves virtual shopping cart 5.

When checking out logic 4 in the consumer device 3 initiates a check-out display 300 that may be directly connected (or through server 1) to POS terminal 2. At this moment the main control of shopping cart 5 is moved from logic 4 of user device 3 to logic 6 of POS terminal 2. Logic 4 on consumer device 3 is arranged to electronically identify check-out code 12, which is used to connect to POS terminal 2 for completion of sales. Check-out display 300 shows shopping cart 5 and its items and preferably also all the changes that cashier S might do at POS terminal 2 (e.g. adding additional items, removing an item adding a bonus or changing the quantity of items, etc.). Preferably all actions are momentarily pushed to logic 4 in consumer device 3 and presented to user U in real time as they are handled by cashier S.

Direct messages between POS terminal 2 by means of POS logic 6 and consumer device 3 by means of logic 4, may follow the steps as schematically shown in FIG. 7A.

Client C scans check-out code 12 located adjacent to POS terminal 2. Client C decodes check-out 12 code and extracts the POS terminal identifier (see FIG. 14B). Client C then calls server 1, providing the POS terminal identifier and requests a check-out session at the identified POS terminal 2. Server 1 creates a check-out session and returns a session identifier. When the check-out session is created, client C calls server 1 with the newly created session identifier and awaits the response from POS logic, preferably direct online messaging (see FIG. 7A).

POS logic 6 may or may not accept the request depending of the state of POS terminal 2. POS logic 6 may return a message with one of the following status codes:

Pending—Cashier S has accepted the check-out session in the POS terminal 2. A copy of virtual shopping cart 5 is appended.

Busy—POS terminal 2 is busy with another check-out session or is in a state which makes POS terminal 2 unavailable (e.g. occupied with other tasks)

NotAcceptedByClerk—Check-out session is actively denied by cashier S.

If cashier S accepts the check-out session in POS terminal 2, POS logic 6 retrieves virtual shopping cart 5 from server 1. At this stage the control of virtual shopping cart 5 is shifted from client C to POS logic 6. All changes made to virtual shopping cart 5 are now preferably made by POS logic 6 exclusively, although client C may request additional items to be added to virtual shopping cart 5. Requests made by client C may be applied by POS logic 6.

Each time POS logic 6 updates virtual shopping chart 5, a copy of it may be sent to the client C using direct messaging. Client C retrieves the copy of virtual shopping chart 5 and may update the display of consumer device 300.

When cashier S register payments to finalize the session each payment is attached to virtual shopping cart 5 as its own payment line. On each payment line change a new copy of virtual shopping cart 5 is sent to client C whereby display on consumer device 300 may be updated.

When the sum of all registered payments cover the cost of all registered items the cashier S may complete the transaction.

Cashier S may cancel a transaction at any time whereby a notification is sent to client C. User U by means of logic 4, may terminate the session whereby virtual shopping cart 5 is voided and client C returns to an idle state. In the case where user U initiated a self-service shopping session prior to the check-out he/she/it may continue that self-service shopping session.

User U may cancel check-out at any time whereby a notification is sent to POS logic 6. User U by means of logic 4, may terminate the session whereby virtual shopping cart 5 is voided and client C returns to an idle state. In the case where user U initiated a self-service shopping session prior to the check-out he/she/it may continue that self-service shopping session.

When cashier S completes the transaction in POS terminal 2, POS logic 6 sends a confirming message, e.g. with status code Ok, to the client C. POS logic 6 also calls server 1 to finalize the session. Server 1 then preferably creates digital receipt 8.

Digital receipt 8 is stored in data storage 14, in a retrievable manner, implying a kind of existence of a receipt folder 140 for each user, which as the skilled person realizes may be achieved in various manners, e.g. by means of having actual electronic folders and/or tables and/or codes that fulfill that purpose.

FIG. 8 shows an example of the workflow for the check-out.

a. When ready cashier S accepts the check-out session in POS terminal 2 and POS terminal 2 starts to send a copy of virtual shopping cart 5 to logic 4 in consumer device 3.

b. Additional items may be added, removed or changed in virtual shopping cart 5 by POS terminal 2 whereupon a new copy of virtual shopping cart 5 is sent to logic 4.

c. Logic 4 displays the virtual shopping cart 5 in display of consumer device 300.

d. Logic 4 in consumer device 3 may send information to POS logic 6 such as requests to add additional items to virtual shopping cart 5.

e. User U pays using methods such as cash, credit card, gift certificate or by mobile payment, by means of payment channel 9 to POS terminal 2. Payment channel 9 may be independent of said consumer device 3, which is a beneficial advantage by means of the system of the invention.

f. When payment is completed POS logic 6 notifies server 1 to set the session as finalized.

g. Digital receipt 8 is generated in data storage 14.

h. POS logic 6 notifies logic 4 in consumer device 3 that the check-out session is completed.

i. Logic 4 calls server 1 and retrieves digital receipt 8.

j. Logic 4 may update the display of consumer device 300 with the digital receipt 8.

After user U have paid and when the check-out session is ended the displayed view may switch to a view displaying digital receipt 8.

In the menu based shopping the user may preferably search for items or select items from a palette. The items may be grouped in an easily navigable format such as list (e.g. food chart), tree (e.g. list of lists or zoomable grids of subgrids), graph structures (e.g. hyper link documents/lists), map (e.g. items ordered by position on the screen), etc.

Parameters that may affect the order presented items may include

- Attributes of the user U such as age, gender or any other available attribute.
- Purchase history of user U or other users of the system.
- Current or past geolocation of consumer device 3 containing the logic 4.
- Date and time such as ranges, holidays, seasons, time of day, etc.
- Environmental information such as current, past or predicted weather, political situation, media information, etc.
- Promotional or loyalty programs.
- Coupons and gift certificates.
- Recommendations and reviews from external sources such as price comparison sites, social media, etc.
- Currently registered items in virtual shopping cart 5.
- Attributes of merchandise such as stock status, location in store (17) or any other available attribute.

An item may be structured in the following way:
- Singular item represents a merchandise with attributes such as color, unit of measure, etc.
- Choice item, meaning that an item must be selected from a predefined set of items. E.g. if the item is a soft drink user U must make a selection from the items Coke, Fanta, Sprite, etc.
- Composite item, meaning that the item composed by two or more items. Each item is quantified in the context of the composite item. E.g. a burger meal may consist of the items burger, french fries and soft drink, etc.

An item is recursive in its nature. E.g. a choice or composite item may be a set of other singular, choice or composite items in any combination.

Items may be edited in prior to or after user U adds the item to virtual shopping cart 5 according to editing rules defined by the merchant. E.g. quantity, composition of composite item (add, remove or modify ingredients) and choice items.

User U selects items utilizing the user interface on consumer device 3 whereby the item is added to virtual shopping cart 5. The total value of the virtual shopping cart 5 may be updated as a result of an item registration.

Figure 5:
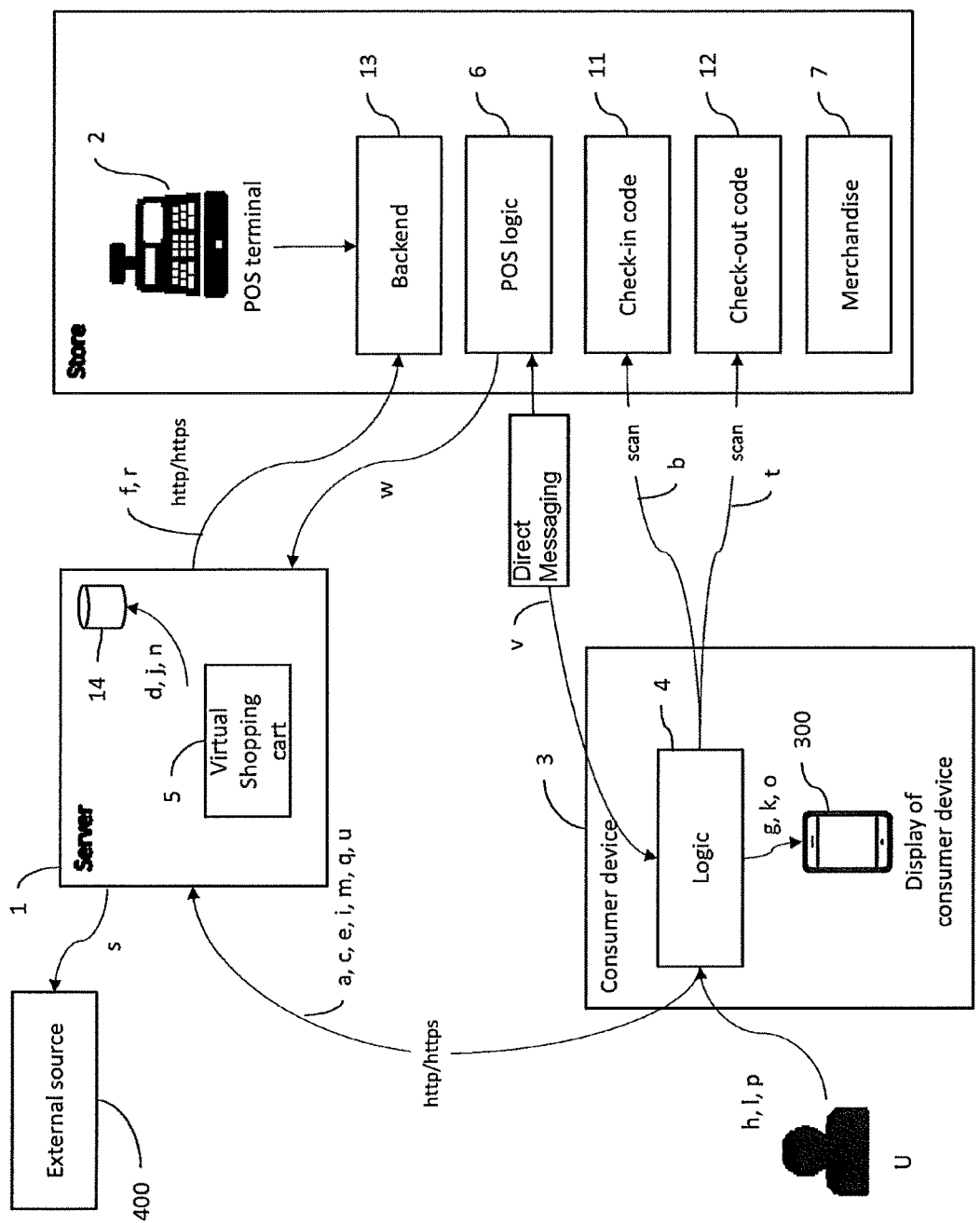
FIG. 5 shows a preferred embodiment of the workflow of menu based shopping.

FIG. 5 shows an example of the workflow of menu based shopping.

a. Logic 4 in consumer device 3 calls server 1 and retrieves a list of nearby stores (17), based on the current location from a GPS function in consumer device 3, from which user U may select a specific store (17).

b. Logic 4 in consumer device 3 may also select a store (XX) by scanning a specific check-in code 11 containing an identifier for the selected store (17).

c. Logic 4 starts a new menu based shopping session by calling server 1 with the identifier for the selected store (17).

d. Server 1 creates a new session and a virtual shopping cart 5 in data storage 14.

e. The logic 4 in consumer device 3 calls server 1 to retrieve a list of merchandise items 7.

f. Server 1 calls backend 13 and retrieves a list of merchandise items 7 which is returned to logic 4.

g. Logic 4 displays the list of merchandise 7 in display of consumer device 300.

h. User U selects an merchandise 7 by means of logic 4.

i. Logic 4 calls server 1 with the identity of selected merchandise 7.

j. Server 1 updates the shopping cart 5 in data storage 14 whereby virtual shopping cart 5 is returned to logic 4.

k. Logic 4 may update display of consumer device accordingly.

l. The user U may modify an item in the virtual shopping cart 5 by means of logic 4. Examples of modifications on a line may include removal or changing the quantity of items in virtual shopping cart 5.

m. Logic 4 calls server 1 to apply the modification on the corresponding item in virtual shopping cart 5.

n. Server 1 updates virtual shopping cart 5 in data storage 14. Virtual shopping cart 5 is then returned to logic 4.

o. Logic 4 may update display of consumer device accordingly.

p. User U may acquire more information about scanned merchandise 7 by means of logic 4.

q. Logic 4 sends a request to server 1 with the identity of merchandise 7.

r. Server 1 calls backend 13 and retrieves information about the merchandise 7.

s. Server 1 may call external sources 400 for additional information about merchandise 7. Examples of external sources are manufacturers, price comparison web sites, etc. Gathered information is returned to logic 4.

t. When self-service shopping session ends, user U scans check-out code 12, e.g. located adjacent to one of the POS terminals 2 by means of logic 4.

u. Logic 4 calls server 1 and requests a check-out and retrieves the direct message address of POS terminal 2.

v. Logic 4 sends a check-out request to POS terminal 2 using direct message.

w. POS terminal 2 calls server 1 and retrieves virtual shopping cart 5.

Accounts may be associated with each other. This enables direct communication between consumer devices 3 where respective users U are logged in. Direct communication may facilitate functionality such as:

- Transfer items from one user U's virtual shopping cart 5 to another user U's virtual shopping cart 5.
- View another user U's virtual shopping cart 5 in real time.
- Send messages between users U.
- Transfer or exchange gift certificates, coupons, loyalty/bonus points, receipts with associated information such as warranty information, etc.

Transferring items may facilitate functionality such as splitting virtual shopping cart 5 into several payment transactions (e.g. restaurant bills), or merging two or more virtual shopping carts 5 to one for a single payment transaction, in POS terminal 2.

View another user U's virtual shopping cart 5 in real time may facilitate functionality such as tracking the completion of a common shopping list.

Send messages between users U may facilitate functionality such as human communication interaction (e.g. to coordinate the purchase of merchandise).

The workflow for associating accounts may follow the steps below as schematically shown in FIG. 9:
- a. User U:1 invokes the functionality to associate with another user U in client C.
- b. Logic 4:1 calls server 1 to create an association id.
- c. Server 1 creates a new association id in data storage 14.
- d. Logic 4:1 displays an association code which contains the association id on display of consumer device 300:1.
- e. User U:2 invokes the functionality to complete the association with another user U.
- f. Logic 4:2 activates the camera scanner view on display of consumer device 300:2
- g. User U:2 scans the association code on the display of consumer device 300:1 using consumer device 3:2.
- h. Logic 4:2 calls server 1 and retrieves information about the association.
- i. Server 1 retrieves display information (e.g. name and avatar of user U:1) about the association from data storage 14 and returns it to logic 4:2.
- j. Logic 4:2 prompts the user U:2 about the association on display of consumer device 300:2.
- k. User U:2 accepts the association.
- l. Logic 4:2 calls server 1 and accepts the association.
- m. Server 1 updates the association id in data storage 14 and retrieves display information (e.g. name and avatar of user U:2).
- n. Server 1 notifies logic 4:1 with the response of user U:2.
- o. Logic 4:1 prompts the user U:1 to acknowledge the response of user U:2 on display of consumer device 300:2.
- p. User U:1 acknowledges the response of user U:2.
- q. Logic 4:1 calls server 1 about the acknowledgement.
- r. Server 1 permanently writes the association to data storage 14.
- s. Server 1 notifies the logic 4:2 that the association is completed.
- t. Logic 4:2 notifies the user U:2 that the association is completed on the display of consumer device 300:2.

In a preferred embodiment of the invention a code printed on a paper receipt 5, from a previous purchase, may be scanned using consumer device 3 whereby paper receipt 15 is imported from backend 13 and stored into receipt archive 140 as a digital receipt 8.

To facilitate transferring items between virtual shopping carts 5 the following preconditions shall preferably be met:
  User accounts of User U:1 and user U:2 are associated with each other.
  Both user U:1 and user U:2 have active sessions in the same store (17).

To transfer single items from user U:1's virtual shopping cart 5:1 to user U:2's virtual shopping cart 5:2 follow the steps below as schematically shown in FIG. 13A:
- a. User U:1 invokes functionality to select one or more items in his/her/its virtual shopping cart 5:1 in logic 4:1 and to transfer these items to user U:2.
- b. Logic 4:1 calls server 1 with the association id and a list of items to transfer.
- c. Server 1 creates a transfer request in data storage 14 containing source and destination session id and the list of items to transfer.
- d. Server 1 notifies logic 4:2 about the transfer request.
- e. Logic 4:2 prompts user U:2 about the transfer request on display of consumer device 300:2.
- f. User U:2 accepts the transfer request.
- g. Logic 4:2 calls server 1 to acknowledge the transfer request.
- h. Server 1 performs the transfer request by removing the items in virtual shopping cart 5:1 and adding the items to virtual shopping cart 5:2 and then deletes the transfer request in data storage 14.
- i. Server 1 notifies logic 4:2 that the transfer request is performed and with the virtual shopping cart 5:2 attached.
- j. Logic 4:2 may display the virtual shopping cart 5:2 in display of consumer device 300:2.
- k. Server 1 notifies logic 4:1 that the transfer request is performed and with the virtual shopping cart 5:1 attached.
- l. Logic 4:1 may display the virtual shopping cart 5:1 in display of consumer device 300:1

To merge virtual shopping carts 5 (i.e. transferring all items from virtual shopping cart 5:1 to virtual shopping cart 5:2) follow the steps below as schematically shown in FIG. 13B:
- a. User U:1 invokes functionality to transfer his/her/its virtual shopping cart 5:1 in logic 4:1 to user U:2.
- b. Logic 4:1 calls server 1 with the association id and session to transfer.
- c. Server 1 creates a transfer request in data storage 14 containing source and destination session id to transfer.
- d. Server 1 notifies logic 4:2 about the transfer request.
- e. Logic 4:2 prompts user U:2 about the transfer request on display of consumer device 300:2.
- f. User U:2 accepts the transfer request.
- g. Logic 4:2 calls server 1 to acknowledge the transfer request.
- h. Server 1 performs the transfer request by removing the items in virtual shopping cart 5:1 and adding the items to virtual shopping cart 5:2 and then deletes the transfer request and the virtual shopping cart 5:1 in data storage 14.
- i. Server 1 notifies logic 4:2 that the transfer request is performed and with the virtual shopping cart 5:2 attached.
- j. Logic 4:2 may display the virtual shopping cart 5:2 in display of consumer device 300:2.
- k. Server 1 notifies logic 4:1 that the transfer request is performed.
- l. Logic 4:1 notifies the user U:1 and updates display of consumer device 300:1 accordingly.

Viewing another user U's virtual shopping cart 5 in real time follow the steps below as schematically shown in FIG. 13C:
- a. Logic 4:1 queries server 1 for any users that have active sessions and are associated with user U:1 (in this case the response is user U:2).
- b. Logic 4:1 prompts user U:1 if he/she/it wants to subscribe to events related to virtual shopping cart 5:2.
- c. User U:1 accepts.
- d. Logic 4:1 calls server 1 with the association id to subscribe to virtual shopping cart 5:2.
- e. Server 1 creates a subscription request in data storage 14 containing source and destination session id for subscription.
- f. Server 1 notifies logic 4:2 about the subscription request.
- g. Logic 4:2 prompts user U:2 about the subscription request on display of consumer device 300:2.
- h. User U:2 accepts the subscription request.
- i. Logic 4:2 calls server 1 to acknowledge the subscription request.
- j. Server 1 activates the subscription in data storage 14.

k. Server 1 notifies logic 4:2 that the subscription is active with the virtual shopping cart 5:1 attached.

l. Logic 4:2 may display the virtual shopping cart 5:1 in display of consumer device 300:2.

m. Server 1 notifies logic 4:1 that the subscription is active with the virtual shopping cart 5:2 attached.

n. Logic 4:1 notifies the user U:1 and updates display of consumer device 300:1 accordingly.

When the above flow is finished any changes made to virtual shopping cart 5:1 a copy of virtual shopping cart 5:1 is sent by server 1 to logic 4:2 and vice versa.

It is also within the ambit of the invention enable functionality for user U to scan paper receipts from previous purchases the POS terminal If digital receipt 8 is not ready for import at backend 13, server 1 may notify the backend 13 to import digital receipt 8 when ready. User U may be notified that digital to receipt 8 is to be found in receipt archive 140 when digital receipt 8 has been imported. A receipt import may follow the steps below as schematically shown in FIG. 10A;

a. POS terminal 2 finalizes a transaction and produces a paper receipt 15, containing a code that uniquely identifies the store (17) and the paper receipt 15.

b. POS logic 6 calls backend 13 and stores a digital version 141 of the paper receipt 15 with the unique identifier from step a.

c. User U invokes functionality to import paper receipt 15 using logic 4 in consumer device 3.

d. Logic 4 updates display of consumer device 300 with functionality for scanning codes.

e. Logic 4 scans a code on a paper receipt 15 from a previous purchase and retrieves the unique identifier of the store (17) and receipt from step a.

f. Logic 4 calls server 1 with the identity of user U and the identifier if the store (17) and receipt from step a.

g. Server 1 queries data storage 14 for a session id matching the unique identifier of the store (17) and receipt from step a to ensure that there is no match then associates user U with the identifier if the store (17) and receipt from step a.

h. Server 1 retrieves the backend connection information from data storage 14 using the store (17) identity.

i. Server 1 calls backend and requests the receipt 141 with the identifier if the store (17) and receipt from step a.

j. Server 1 generates a session id and stores the receipt 141 into receipt archive 140 for user U.

k. Server 1 updates the association mention in step g with the session id generated in step j in data storage 14.

l. Logic 4 displays the digital receipt 141 on display of consumer device 300.

POS logic 6 may not yet have stored the receipt 141 in backend 13 when user U scans the code on paper receipt 15. In that scenario the receipt import may follow the steps below as schematically shown in FIG. 10B:

a. POS terminal 2 finalizes a transaction and produces a paper receipt 15, containing a code that uniquely identifies the store (XX) and the paper receipt 15.

b. User U invokes functionality to import paper receipt 15 using logic 4 in consumer device 3.

c. Logic 4 updates display of consumer device 300 with functionality for scanning codes.

d. Logic 4 scans a code on a paper receipt 15 from a previous purchase and retrieves the unique identifier of the store (17) and receipt from step a.

e. Logic 4 calls server 1 with the identity of user U and the identifier if the store (17) and receipt from step a.

f. Server 1 queries data storage 14 for a session id matching the unique identifier of the store (17) and receipt from step a to ensure that there is no match then associates user U with the identifier if the store (17) and receipt from step a.

g. Server 1 retrieves the backend connection information from data storage 14 using the store (17) identity.

h. Server 1 calls backend and requests the receipt 141 with the identifier if the store (17) and receipt from step a. Backend 13 responds with a status code that indicates that the receipt 141 may be delivered later.

i. Logic 4 notifies the user in display of consumer device 300 that the receipt 141 may be delivered later.

j. POS logic 6 calls backend 13 and stores a digital version 141 of the paper receipt 15 with the unique identifier from step a.

k. Backend 14 delivers the receipt 141 to server 1.

l. Server 1 generates a session id and stores the receipt 141 into receipt archive 140 for user U.

m. Server 1 updates the association mention in step f with the session id generated in step 1 in data storage 14.

By tapping on a "Share button" in the client C a user may select to share a digital receipt 8, in a preferred embodiment.

A list may be shown in display of consumer device 300 to show available options for sharing digital receipt 8 for user U:

Hosting services such as DropBox, Google Drive, etc.

E-mail attachment.

ERP-system 16, where it may be electronically and preferably automatically handled.

Social media such as Facebook, Google Plus, etc.

When sending digital receipt 8 to a file hosting service or as e-mail the digital receipt 8 may be converted to a suitable file format (such as PDF or similar). The option to send the receipt to ERP-system will normally require that the user is identified as an employee at a company connected to the ERP-system. The system may also require an existing integration (such as SIE or other standard integration methods) between the system of the invention and ERP-system of that company. Sharing a digital receipt 8 may be done as follows as shown in FIG. 11;

a. A user enters a command to share a digital receipt 8 in logic 4 in consumer device 3, which sends the request to server 1.

b. Digital receipt 8 is exported via server 1.

c. Chosen recipient 16 receives digital receipt 8;

1. If user U is connected to a company digital receipt 8 may be exported to a recipient 16 connected to that company, e.g. transferred to ERP system of that company.

2. As an e-mail attachment (such as PDF or similar) sent from the server 1 to a recipient 16, i.e. to mail recipient.

3. As a file (PDF or similar) and stored at a recipient 16 in the form of a file hosting service.

When transferring a digital receipt from a user (user U:1) to another user (user U:2) the digital receipt 140A may be copied into a new digital receipt 140B and stored in data storage 14 for user U:2 and preferably thereafter deleted or marked as transferred for user U:1. Transferring a digital receipt 8 from user U:1 to user U:2 may imply that its ownership is changed from user U:1 to user U:2. The digital receipt 8 may still be partially accessible (i.e. unable to further share or transfer the digital receipt 8) for user U:1 after it has been transferred to user U:2.

Transferring receipts may require that the accounts of user U:1 and user U:2 is associated with each other as previously described in this document. User U:1 may preferably select user U:2 from a list containing already associated accounts. User U:1 may also have the possibility to create a new association with user U:2, following the previously described procedure.

Transfer a digital receipt 8 may be done as follows as shown in FIG. 12;
  a. User U:1 invokes the functionality transfer a digital receipt 140A
  b. Logic 4:1 may display a list of associated accounts
  c. User U:1 selects the associated account of user U:2.
  d. Logic 4:1 calls server 1 with association id identifying the associated account of user U:2.
  e. Server 1 retrieves the account id for user U:2 from data storage 14 using the association id.
  f. Server 1 marks the digital receipt 140A as in pending transfer.
  g. Server 1 notifies logic 4:2 about the pending transfer.
  h. Logic 4:2 notifies the user U:2 to about the request on display of consumer device 300:2.
  i. Immediately or at a some point later in time, logic 4:2 retrieves the pending transfer from server 1.
  j. Logic 4:2 prompts the user U:2 about the pending transfer on display of consumer device 300:2.
  k. User U:2 accepts the transfer.
  l. Logic 4:2 calls server 1 and accepts the request.
  m. Server 1 copies digital receipt 140A into 140B and marks digital receipt 140A as transferred and removes the pending transfer in data storage 14.

The system may let users U gain award points by performing different tasks in the client C. Examples of award-based tasks are:
  A user U invites another person to use the system and earns award points.
  A user U buys something at a store (17) that is currently running a bonus program and earns award points. The user U may use these award points at the store (17) according to the rules set by that store (17).
  A user U buys some merchandise 7 at a store (17) where the manufacturer of that product is running a bonus program. The user U may use these award points at any reseller of the product according to the rules set by the manufacturer.

In a preferred embodiment a user U may see the current awards when checked in at a store (17). A list may show the award bonus programs that the store (17) is currently running and other bonus programs that the user U may take part in. Once an award is achieved, for example if the user U has earned a certain amount of points, the award may be used.
  a. A user U checks in at a store (17) by scanning the check-in code 11 or e.g. by selecting the store (17) in a list (e.g. a "Nearby stores" list).
  b. Logic 4 in the consumer device 3 calls server 1 for a list of award bonus to programs for the store (17) and for current user U.
  c. Server 1 calls the backend 13 of or a list of award bonus programs for the current user U.
  d. Server 1 retrieves reseller bonus programs that user U may take part in and the current award bonus balance for the current user U from a table storage at backend 13 of that store (17).
  e. User U uses some of the award points via the logic 4 in the consumer device 3.
  f. Logic 4 in the consumer device 3 calls server 1 which adjusts the current award bonus point balance in table storage at the backend 13 of that store (17).

In a preferred embodiment a value check exchange may make it possible for users U to "sell" earned awards to other users U on an open value check exchange.

In FIG. 14 A there is shown an example of a check-in code 11, comprising at least a code uri 110 identifying the system according to the invention and a store code id 111 uniquely identifying the store. As shown the check-in code 11 preferably also comprises a checksum 112 validating the uri code 110, wherein preferably said checksum is based on a cryptographically secure keyed hash function. The store code id 111 preferably includes a set of identifying sub codes 111A, 111B, 111C, preferably including at least country id 111A identifying the country of the store, organization id 111B identifying organization of the store and store id 111C identifying the actual store.

In FIG. 14 B there is shown an example of a check-out code 12, comprising at least a code uri 110 identifying the system and a register code id 120 uniquely identifying a POS terminal 2. The check-out code 11 preferably also comprises a checksum 112 validating the uri code 110, wherein preferably said checksum is based on a cryptographically secure keyed hash function. The register code id 120 preferably includes a set of identifying sub codes 111A, 111B, 111C, 120D, preferably including at least country id 111A identifying the country of the store, organization id 111B identifying organization of the store, store id 111C identifying the actual store and a POS terminal code id 120D identifying the actual POS terminal 2. In the preferred embodiment the basic code structure of the store code id 111 is used the check-out code 12.

In FIG. 14 C there is shown an example of receipt code 80, comprising at least a code uri 110 identifying the system, a register code id 120 uniquely identifying a POS terminal 2 and receipt id 82. The receipt code 12 preferably also comprises a checksum 112 validating the uri code 110, wherein preferably said checksum is based on a cryptographically secure keyed hash function. The register code id 120 preferably includes a set of identifying sub codes 111A, 111B, 111C, 120D, preferably including at least country id 111A identifying the country of the store, organization id 111B identifying organization of the store, store id 111C identifying the actual store and a POS terminal code id 120D identifying the actual POS terminal 2. The receipt id 82 is a unique identifier for each receipt matching the receipt id in the backend 13 of the store. In the preferred embodiment the same code structure is used regarding register code id 120 as for the check-out code 12.

In FIG. 14 D there is shown an example of an account association code 22, comprising at least a code uri 110 identifying the system and an association code id 220. The account association code 22 preferably also comprises a checksum 112 validating the uri code 110, wherein preferably said checksum is based on a cryptographically secure keyed hash function. The association code id 220 is a unique identifier for an association between two clients C;1, C;2. The account association code 22 may also include a receipt id 82, which is a unique identifier for each receipt matching the receipt id in the backend 13 of the store. In the preferred embodiment the same code structure is used regarding receipt id 82 as for the receipt code 80.

The invention is not limited by the examples described above but may be varied within the scope of the pending claims. In this regard it is referred to the listing in the introductory portion of the description where some expressions used in the claims are discussed in more details in order to clarify that the chosen claim language may not be given a too narrow interpretation. It is submitted that for the skilled person is evident that many conceptual aspects of the invention have to be broadly construed, and that their function may be achieved by means of various solutions that are known to the skilled person. Further the claims shall be construed in such a manner that in a special case of the invention, check-in and initiating of check-out is performed in one and the same step, i.e. in a situation where the selected merchandise 7 are not firstly registered via the client device 3 but via a point of sale terminal 2 (in manner a more similar to traditional shopping). In such a situation check-in and initiating of check-out will take place substantially at the same time, i.e. different from the "normal" procedure described above, where there is a time gap between check-in and check-out.

Moreover it is foreseen that some of the aspects defined in the description may be the subject of their own patent protection. For instance the direct communication arrangement of the invention includes aspects that may provide advantages per se, i.e. also if not having any client interconnected with POS terminal nor a virtual shopping cart, for instance for sharing a digitally stored listing or other kind of information, for joint real time updated information and preferably also provide interaction between a plurality of clients in real time. Furthermore also the aspect related to interconnecting producers and clients by means of unique merchandise identifiers 70 may also be an aspect that will be subject for its own patent protection. Further also the aspect related to a system facilitating payment by different means, possibly not connected to the client device, (e.g. cash, or card and cash, etc) may be an aspect that will be subject for its own patent protection. Moreover also the aspect related to the use of check-in codes may be an aspect that will be subject for its own patent protection. Also aspects related to the code structure in connection with check-out may be an aspect that will be subject for its own patent protection, as further aspects mentioned in the detailed description.

The invention claimed is:

1. A system comprising:
a server in communication with a plurality of consumer devices and point-of-sale (POS) terminals configured to communicate wirelessly with the plurality of said consumer devices; and
a logic stored on the consumer device configured to identify a store, provide check-in in said store thus creating a virtual shopping cart for shopping at said store and provide check-out for payment at said POS terminal in said store,
logic stored on the POS terminal configured to provide communication with said consumer device, wherein said logics are configured to provide said POS terminal to complete the sale of merchandise contained in said virtual shopping cart, and to produce a physical receipt and/or an electronic receipt, wherein said virtual shopping cart is handled by said server and wherein said logics are multitenant and are configured to provide completion of said sales by means of direct communication via said server, said logic stored on the consumer device is configured to electronically identify a check-in code and to use said check-in code to check in at a store, and said logic stored on the consumer device is configured to electronically identify a check-out code and to use said check-out code to connect to a point-of-sale terminal for completion of a sale.

2. The system according to claim 1, wherein said logics are multitenant and are configured to provide completion of said sales by means of direct communication via said server.

3. The system according to claim 2, wherein said logics are configured to produce an electronic receipt.

4. The system according to claim 1, wherein said server includes a plurality of direct messaging router nodes and a routing table configured to connect to said logics.

5. The system according to claim 1, wherein said POS terminal is configured to enable payment by means of a payment channel that can be independent of said consumer device.

6. The system according to claim 1, wherein said logic stored on the consumer device is configured to enable authorization by means of third party identity provider.

7. The system according to claim 1, wherein said logic stored on the consumer device is configured to electronically identify a check-in code and to use said check-in code to check in at a store.

8. The system according to claim 7, wherein said check-in code comprises a code uri identifying the system and a store code id uniquely identifying the store.

9. The system according to claim 8, wherein said check-in code comprises a checksum validating the uri code.

10. The system according to claim 9, wherein said checksum is based on a cryptographically secure keyed hash function.

11. The system according to claim 9, wherein said store code id includes at least country id identifying the country of the store, organization id identifying organization of the store and store id identifying the actual store.

12. The system according to claim 8, wherein said store code id includes a set of identifying sub codes.

13. The system according to claim 12, wherein said sets of identifying sub codes include at least some sub codes which are the same for both the check-in code and check-out code respectively.

14. The system according to claim 1, wherein said logic stored on the costumer device is configured to electronically identify a check-out code and to use said check-out code to connect to a point-of-sale terminal for completion of a sale.

15. The system according to claim 14, wherein said check-out code comprises a code uri identifying the system and a register code id uniquely identifying a POS terminal.

16. The system according to claim 15, wherein said check-out code comprises a checksum validating the uri code.

17. The system according to claim 16, wherein said checksum is based on a cryptographically secure keyed hash function.

18. The system according to claim 16, wherein said register code id includes a set of identifying sub codes.

19. The system according to claim 18, wherein said register code id includes at least country id identifying the country of the store, organization id identifying organization of the store, store id identifying the actual store and a POS terminal code id identifying the actual POS terminal.

20. The system according to claim 19, wherein said sets of identifying sub codes include at least some sub codes which are the same for both the check-in code and check-out code respectively.

21. The system according to claim 1, wherein said logics are configured to provide real time view within the display of the consumer device displaying the information processed by said POS terminal.

22. A payment method comprising:
a server communicating with a plurality of consumer devices, point-of-sale (POS) terminals configured to communicate wirelessly with the plurality of the consumer devices; and a logic stored on the consumer device identifying a store, providing check-in in said store thus creating a virtual shopping cart providing shopping at said store and providing check-out for payment at said point-of-sale (POS) terminals in said store, logic stored on the point-of-sale (POS) terminal providing communication with said consumer device, wherein said logics are configured to provide said point-of-sale (POS) terminals to complete the sale of merchandise contained in said virtual shopping cart, and to produce a physical receipt and/or an electronic receipt, wherein said server is also communicating with the plurality of point-of-sale (POS) terminals and said virtual shopping cart is handled by said server, said logics are multitenant and provide completion of said sales by means of direct communication via said server, said logic stored on the consumer device electronically identifies a check-in code and uses said check-in code to check in at a store, said logic stored on the consumer device electronically identifies a check-out code and uses said check-out code to connect to a point-of-sale (POS) terminal for completion of a sale.

23. The method according to claim 22, wherein said logics provide real time view within a display of the consumer device displaying the information processed by said point-of-sale (POS) terminal.

24. The method according to claim 22, wherein said server includes a plurality of direct messaging router nodes and a routing table configured to connect to said logics.

25. The method according to claim 22, wherein said point-of-sale (POS) terminal is configured to provide payment by means of a payment channel that can be independent of said consumer device.

26. The method according to claim 22, wherein said logic stored on the consumer device is configured to provide authorization by means of third party identity provider.

* * * * *